United States Patent
Kang

(10) Patent No.: US 9,949,096 B2
(45) Date of Patent: Apr. 17, 2018

(54) NAVIGATION DEVICE, SYSTEM FOR INPUTTING LOCATION TO NAVIGATION DEVICE, AND METHOD FOR INPUTTING LOCATION TO THE NAVIGATION DEVICE FROM A TERMINAL

(71) Applicant: HYUNDAI MOTOR COMPANY, Seoul (KR)

(72) Inventor: Ki Dong Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/805,045

(22) Filed: Jul. 21, 2015

(65) Prior Publication Data

US 2016/0138931 A1    May 19, 2016

(30) Foreign Application Priority Data

Nov. 17, 2014  (KR) .................. 10-2014-0160304

(51) Int. Cl.
| | | |
|---|---|---|
| *H04W 4/14* | (2009.01) | |
| *G01C 21/36* | (2006.01) | |
| *H04W 4/04* | (2009.01) | |
| *H04W 4/12* | (2009.01) | |

(52) U.S. Cl.
CPC ............ *H04W 4/14* (2013.01); *G01C 21/362* (2013.01); *H04W 4/046* (2013.01); *H04W 4/12* (2013.01)

(58) Field of Classification Search
CPC ......... H04W 4/14; H04W 4/046; H04W 4/12; G01C 21/362
See application file for complete search history.

(56) References Cited

U.S. PATENT DOCUMENTS

| | | | | |
|---|---|---|---|---|
| 7,085,629 B1* | 8/2006 | Gotou | .................. | G01C 21/362 701/1 |
| 2009/0170525 A1* | 7/2009 | Baghdasaryan | ...... | G01S 5/0072 455/456.1 |
| 2013/0046738 A1* | 2/2013 | Kuo | .................... | G06Q 30/0631 707/690 |

(Continued)

FOREIGN PATENT DOCUMENTS

| | | |
|---|---|---|
| KR | 10-0742404 B1 | 7/2007 |
| KR | 10-2009-0066259 A | 6/2009 |

(Continued)

OTHER PUBLICATIONS

Shin et al., KR20090066259, Jun. 23, 2009 (Machine Translation).*

(Continued)

*Primary Examiner* — Courtney D Heinle
(74) *Attorney, Agent, or Firm* — McDermott Will & Emery LLP

(57) ABSTRACT

A navigation device, a system for inputting a place, and a method for inputting a place to the navigation device implement inputting a place to a navigation device communicating with a terminal device, searching for and extracting place-associated information from text received by the terminal device. If the place-associated information is extracted from the text, the implementation carries out transmitting, by the terminal device, the text or the place-associated information detected from the text to the navigation device; and setting, by the navigation device, a place obtained on basis of the place-associated information to a destination.

21 Claims, 14 Drawing Sheets

(56) References Cited

U.S. PATENT DOCUMENTS

| | | | |
|---|---|---|---|
| 2013/0117021 A1* | 5/2013 | James | G01C 21/362 704/235 |
| 2013/0267174 A1* | 10/2013 | Moon | H04W 4/008 455/41.1 |
| 2014/0129133 A1* | 5/2014 | Wang | G01C 21/362 701/409 |
| 2015/0266377 A1* | 9/2015 | Hampiholi | B60K 35/00 455/466 |
| 2016/0109243 A1* | 4/2016 | Tseng | G01C 21/3484 701/408 |
| 2016/0165417 A1* | 6/2016 | Yang | G06F 17/30964 455/466 |

FOREIGN PATENT DOCUMENTS

| | | |
|---|---|---|
| KR | 10-2010-0060501 A | 6/2010 |
| KR | 10-2012-0027735 A | 3/2012 |
| KR | 10-2013-0024414 A | 3/2013 |
| WO | 2011/123273 A1 | 10/2011 |

OTHER PUBLICATIONS

Korean Notice of Patent Allowance, issued in Korean Application No. 10-2014-0160304 dated Aug. 24, 2016, with English Translation.

Korean Office Action issued in Korean Application No. 10-2014-0160304 dated Dec. 30, 2015.

* cited by examiner m30

NAVIGATION DEVICE, SYSTEM FOR INPUTTING LOCATION TO NAVIGATION DEVICE, AND METHOD FOR INPUTTING LOCATION TO THE NAVIGATION DEVICE FROM A TERMINAL

CROSS-REFERENCE TO RELATED APPLICATION(S)

This application claims the benefit of Korean Patent Application No. 2014-0160304, filed on Nov. 17, 2014, in the Korean Intellectual Property Office, the disclosure of which is incorporated herein by reference.

BACKGROUND

1. Field

Embodiments of the present invention relate to a navigation device, a system for inputting a location to the navigation system, and a method for inputting a location to the navigation system from a terminal device.

2. Description of the Related Art

In general, a vehicle is a machine which travels on roads or tracks to carry people or objects from place to place. Vehicles may move in various directions according to rotation of at least one wheel. Such vehicles may include, for example, a three-wheeled or four-wheeled vehicle, a two-wheeled vehicle such as a motorcycle, a motorized bicycle, construction equipment, a bicycle, a train traveling on rails, and the like.

A navigation device may be installed in vehicles. If a destination is decided, the navigation device confirms the current position of a vehicle using a system such as Global Positioning System (GPS), decides a path from the current position to the destination according to the confirmed position, and informs a user who rides in the vehicle of the decided path using voice or image signals.

SUMMARY

Various embodiments of the present invention are directed to providing a navigation device, a system for inputting a location to the navigation device, and a method for inputting a location to the navigation device using a terminal device.

Therefore, it is an aspect of the present invention to provide a navigation device capable of easily setting a position corresponding to a text message received from a third party to a destination of the navigation device, a system for inputting a location to the navigation device, and a method for inputting a location to the navigation device from a terminal device.

Additional aspects of the invention will be set forth in part in the description which follows and, in part, will be obvious from the description, or may be learned by practice of the invention.

In accordance with one aspect of the present invention, a method for inputting a place to a navigation device communicating with a terminal device includes: searching for and extracting place-associated information from text received by a terminal device; if the place-associated information is extracted from the text, transmitting, by the terminal device, the text or the place-associated information detected from the text to the navigation device; and setting, by the navigation device, a place obtained on the basis of the place-associated information to a destination.

The place-associated information may include at least one of an address, a region name, a place type, and a sender intention text.

The setting of the place obtained on basis of the place-associated information to the destination may include: detecting place-associated information by allowing the navigation device to analyze the text; and setting a destination using the detected place-associated information.

The setting of the destination using the detected place-associated information may include: searching for a Point Of Interest (POI) database using the place-associated information detected by analyzing the text; and establishing a destination in response to the search result of the POI database.

The transmitting of the text or the place-associated information detected from the text to the navigation device by the terminal device when the place-associated information is extracted from the text may include: if the place-associated information is at least one of a region name, a place type, and a sender intention text, transmitting the text to the navigation device.

The transmitting of the text or the place-associated information detected from the text to the navigation device by the terminal device, when the place-associated information is extracted from the text, may include: if the place-associated information is an address, transmitting the address to the navigation device by the terminal device. The setting of the place obtained on the basis of the place-associated information to a destination by the navigation device may include: setting the address to the destination by the navigation device.

The searching for and extracting the place-associated information from the text received by the terminal device may include: searching for the place-associated information using a Point Of Interest (POI) database.

The method may further include: receiving the text using at least one of a short message service (SMS), a multimedia message service (MMS), a messenger service, a Web browser, and a social network service (SNS) by the terminal device.

The method may further include: transmitting information regarding a sender of the text to the navigation device by the terminal device.

The setting of the place obtained on basis of the place-associated information to a destination by the navigation device may include: querying whether the place obtained on the basis of the place-associated information is to be set to a destination.

The setting of the place obtained on the basis of the place-associated information to a destination by the navigation device may further include: determining whether the navigation device is in a navigation state indicating a path guiding state; if the navigation device is in the navigation state, determining whether a legacy destination is different from the place obtained on basis of the place-associated information; if the legacy destination is different from the place obtained on basis of the place-associated information, deleting the legacy destination, and querying whether or not the place obtained on the basis of the place-associated information is set to the destination.

The terminal device and the navigation device may be connected with each other through a cable or a wireless communication network.

The method may further include determining, by the terminal device, whether the place-associated information is extracted according to a sender who transmits the text.

In accordance with another aspect of the present invention, a system for inputting a place includes: a terminal device configured to receive text, and to extract place-associated information from the received text; and a navigation device, if the place-associated information is extracted from the text, configured to receive the place-associated information from the terminal device or to receive the place-associated information or a text including the place-associated information, and to establish a destination on basis of the place-associated information.

The place-associated information may include at least one of an address, a region name, a place type, and a sender intention text.

The navigation device may extract the place-associated information by analyzing the text, and establish a destination using the extracted place-associated information.

If the place-associated information is an address, the terminal device may transmit the address to the navigation device, and set the address to a destination.

The terminal device or the navigation device may obtain the place-associated information using a Point Of Interest (POI) database.

The terminal device may transmit information on a sender of the text to the navigation device.

The navigation device may query whether the place obtained on basis of the place-associated information is to be set to a destination.

The navigation device may query whether a legacy destination is identical to the place obtained on basis of the place-associated information, and query whether the place obtained on basis of the place-associated information is to be set to a destination according to a state of the navigation device.

The terminal device may determine whether place-associated information is extracted according to a sender who transmits the text.

In accordance with another aspect of the present invention, a navigation device includes: a receiver configured to receive either text received by a terminal device or place-associated information detected from the text; and a destination setup unit configured to establish a destination on basis of the place-associated information.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
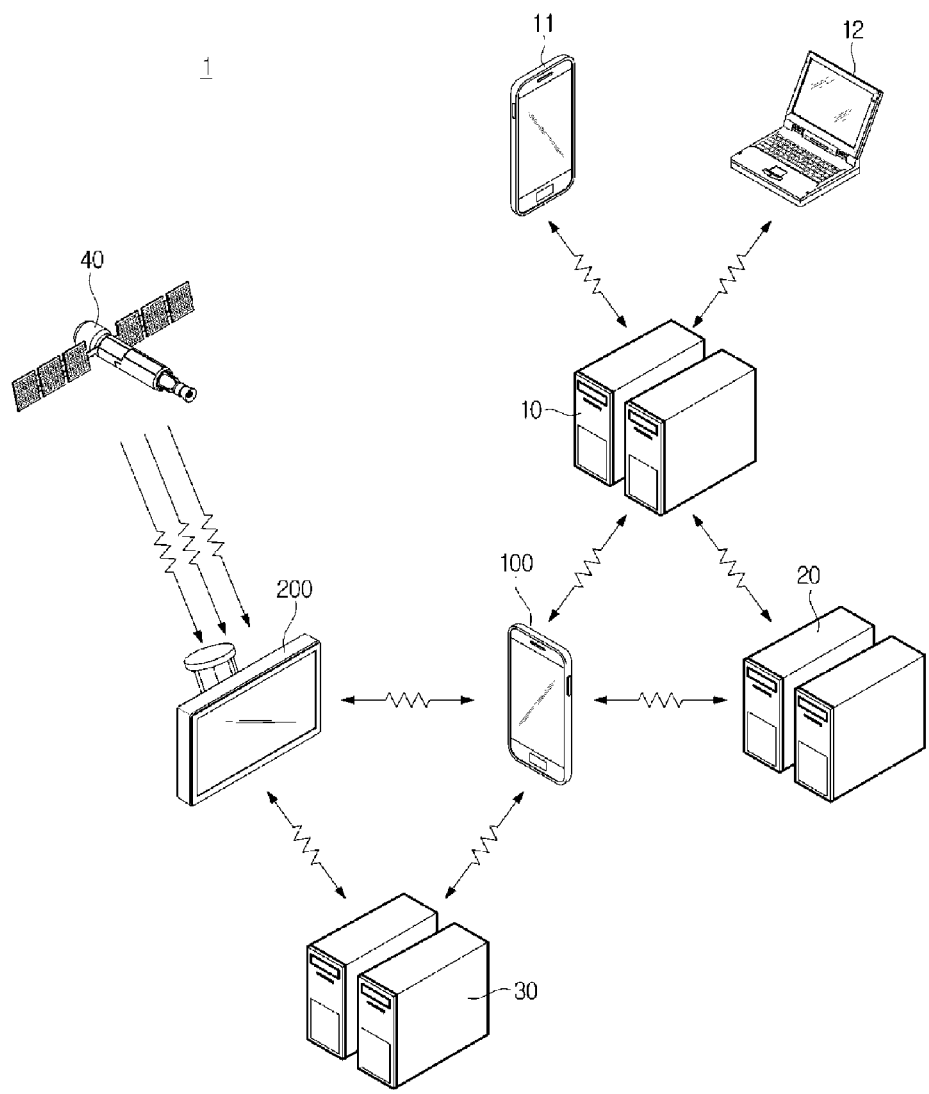
FIG. 1 is a conceptual diagram illustrating a system for inputting a location according to an embodiment of the present invention.

Reference will now be made in detail to the embodiments of the present invention, examples of which are illustrated in the accompanying drawings, wherein like reference numerals refer to like elements throughout.

A terminal device, a navigation device, a vehicle including the navigation device, and a location input system configured to use the terminal device and the navigation device according to the embodiments will hereinafter be described with reference to FIGS. 1 to 6.

FIG. 1 is a conceptual diagram illustrating a system for inputting a location according to an embodiment of the present invention.

Referring to FIG. 1, the location input system 1 may include a terminal device 100 and a navigation device 200.

The terminal device 100 is connected to the navigation device 200, so that the terminal device 100 can directly communicate with the navigation device 200, and data communication can be achieved between the terminal device 100 and the navigation device 200. In addition, the terminal device 100 may be indirectly connected to the navigation device 200 through another server device 30, so that data communication is achieved between the terminal device 100 and the navigation device 200.

In accordance with the embodiment, the terminal device 100 and the navigation device 200 may be interconnected through a wired cable, so that data communication can be achieved between the terminal device 100 and the navigation device 200 through the wired cable. Connectors installed at both ends of the wired cable are respectively coupled to a connection port 160 (See FIG. 3) of the terminal device 100 and a connection port 260 (See FIG. 5) of the navigation device 200, such that the terminal device 100 and the navigation device 200 can be interconnected so that the terminal device 100 and the navigation device 200 can communicate with each other.

In accordance with another embodiment, the terminal device 100 and the navigation device 200 may communicate with each other over a wireless communication network. In this case, the wireless communication network may include short-range wireless communication networks implemented by various short-range communication technologies, for example, Bluetooth, Bluetooth low energy, infrared data association (IrDA), Wireless Fidelity (Wi-Fi), Wi-Fi Direct, Ultra Wideband (UWB), Zigbee or Near Field Communication (NFC), etc. The wireless communication network may further include mobile communication networks based on 3GPP, 3GPP2 or IEEE wireless communication technology, for example, Code Division Multiple Access (CDMA), Wibro, High Speed Packet Access+ (HSPA+), or Long-Term Evolution (LTE), etc.

The terminal device 100 may receive data from an external device (e.g., a message server 10 or a Web server 20) over a communication network, and may transmit the received data to another external device (e.g., the navigation device 200) after completion of fabrication or non-fabrication of the received data. The terminal device 100 may be a portable or mobile device carried by a user.

The terminal device 100 may receive data (e.g., text, still images, or moving images) from additional terminal devices (11, 12) such as a mobile phone, a smartphone, a desktop computer, etc. Here, the text may include characters (letters) or various symbols. In accordance with the embodiment, the terminal device 100 may receive data or information from other terminal devices (11, 12). In this case, information regarding the terminal devices (11, 12) may include at least one of identifier (ID) information (e.g., a sender name) for identifying a sender user who sends data and other ID information (e.g., an allocated phone number or MAC address) for identifying the terminal devices (11, 12). At least one of the ID information for identifying the sender and the other ID information for identifying the terminal devices (11, 12) such as an allocated phone number or MAC address may hereinafter be referred to as sender information.

The additional terminal devices (11, 12) such as a mobile phone, a smartphone, or a desktop computer may transmit data such as text to the terminal device 100 through the message transmission server 10. The additional terminal devices (11, 12) may transmit data to the terminal device 100 according to manipulation by a user who uses the additional terminal devices (11, 12). The message transmission server 10 may intermediate between the terminal device 100 and the additional terminal devices (11, 12). For example, the message transmission server 10 may identify a receiver of data transmitted from the additional terminal devices (11, 12), and transmit data to the identified receiver, so that data communication can be mediated between the terminal device 100 and the additional terminal devices (11, 12).

Data, such as text, received from the additional terminal devices (11, 12) may be transmitted to the terminal device 100 through a short message service (SMS), a multimedia message service (MMS), and various kinds of messenger services or social network services (SNS). In other words, the terminal device 100 may receive text data through SMS, MMS, a message service, SNS, or the like. For this purpose, message-reception-associated applications, instance-messenger-associated applications, or Web-browser or SNS applications may be installed in the terminal device 100 and the additional terminal devices (11, 12).

In addition, the terminal device 100 is connected to the Web server 20 so as to receive text data from the Web server 20. The Web server 20 may be a computing device for providing data such as Web pages to the terminal device 100 connected to the Web server 20 according to the operation of the installed Web-server program. The Web page may include data of at least one of a text, a still image, and a moving image. The Web server 20 may provide data configured in the form of a Web-page file (e.g., HTML file) to the terminal device 100. The terminal device 100 may display the Web page for a user using an application such as a Web browser or the like.

The terminal device 100 may be connected to a Telematics service server 30 connectable to the navigation device 200, and may transmit data such as text to the Telematics service server 30, so that the terminal device 100 can transmit text data to the navigation device 200.

Telematics may be a system capable of providing a variety of services through wireless communication by combining a wireless communication technology to a vehicle. For example, the variety of services based on wireless communication may be a service for diagnosing/managing a vehicle at a remote site, a service for tracking a vehicle position, an Internet access service within a vehicle, an accident detection service, a service for providing various kinds of information, an E-mail transmission/reception (Tx/Rx) service, etc. The telematics service server may be a computing device capable of providing the above-mentioned services. The telematics service server 30 may identify and authenticate the terminal device 100 connected to the telematics service server 30 using various types of terminal-device identification (ID) numbers or terminal device ID numbers. If identification and authentication of the terminal device 100 are completed, the telematics service server 30 may transmit the received data to a vehicle (e.g., a controller for controlling electronic components of the vehicle) corresponding to the identified terminal device 100, so that the telematics service server 30 may transmit data to the navigation device 200 installed at the vehicle. In addition, if identification and authentication of the terminal device 100 are completed, the telematics service server 30 may directly transmit data received from the terminal device 100 to the navigation device 200 installed at the vehicle.

In accordance with one embodiment, the terminal device 100 may include various devices that are capable of communicating with an external device and performing a predetermined operation according to the program result. For example, the above devices may include a feature phone, a smartphone, a Tablet PC, a laptop computer, a personal digital assistance (PDA), or additional navigation device different from the navigation device 200 shown in FIG. 1.

Figure 2:
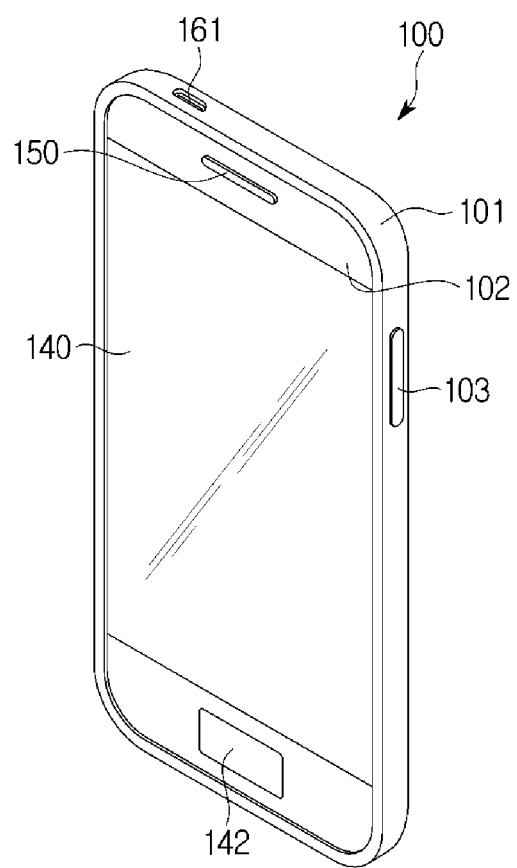
FIG. 2 is a perspective view illustrating a terminal device according to an embodiment of the present invention.
Figure 3:
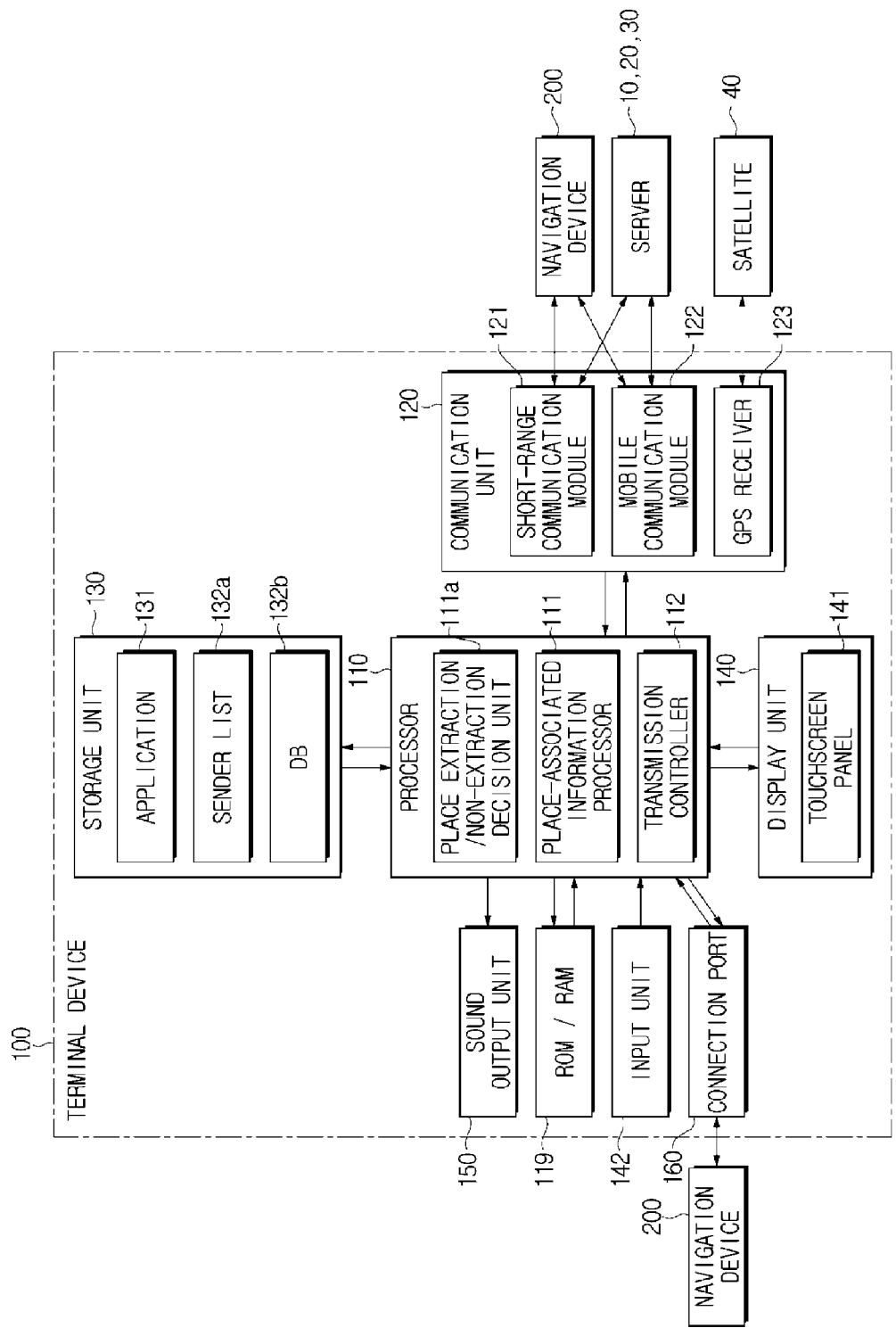
FIG. 3 is a block diagram illustrating a terminal device according to an embodiment of the present invention.

FIG. 2 is a perspective view illustrating a terminal device according to an embodiment of the present invention. FIG. 3 is a block diagram illustrating a terminal device according to an embodiment of the present invention.

Although the embodiments shown in FIGS. 2 and 3 illustrate that the terminal device 100 is a smartphone by this example, the scope or spirit of the terminal device 100 is not limited thereto, and the terminal device 100 may include a variety of devices capable of communicating with an external device and performing a series of operations according to the programming result.

Referring to FIG. 2, the terminal device 100 may include an external housing 101 that includes a variety of electronic components and fixes the electronic components to an interior part; a display unit 140 mounted to a front surface 102 of the external housing 101; and input units (103, 142) for inputting a variety of commands.

The electronic components embedded in the external housing 101 may include a printed circuit board (PCB), a semiconductor chip (such as a processor chip or a communication chip) mounted to the PCB, a memory device such as a Secure Digital (SD) card, a battery, a variety of wirings or lines, etc. In accordance with the embodiment, the external housing 101 may include a power-supply terminal through which the battery is charged with electricity or respective components are powered on.

Referring to FIG. 3, the terminal device 100 may include a processor 110, a ROM and/or RAM 119, a communication unit 120, a storage unit 130, a display unit 140, an input unit 142, a sound output unit 150, and a connection port 160. In accordance with the embodiment, some parts of the above-mentioned components may be omitted as necessary.

The processor 110 may control overall operations of the terminal device 100, and may process a variety of calculations needed for operating the terminal device 100.

For example, the processor 110 may drive one or more applications 131 installed into the terminal device 100 in such a manner that the terminal device 100 can perform reserved operations according to the one or more applications 131. The processor 110 may be implemented by one or more processors mounted to the PCB embedded in the external housing 101. For example, the processor 110 may include a Central Processing Unit (CPU) or a Graphic Processing Unit (GPU).

The application 131 may indicate a set of computer programs designed to perform a specific task. The application 131 may be stored in the storage unit 130. The application 131 may be embedded in the terminal device 100 using an application installation program applied to the terminal device 100. The application 131 or the application installation program may be applied to the terminal device 100 over a wired communication network or a wireless communication network. Alternatively, the application 131 may be applied to the terminal device 100 using a Universal Serial Bus (USB) memory device or memory card connectable to the terminal device 100, for example, using a variety of memory devices such as a Secure Digital (SD) card.

If the terminal device 100 is connected to the navigation device 200 or the like so as to communicate with the navigation device 200 or the like, the processor 110 may automatically retrieve the application 131 and drive the application 131.

In accordance with one embodiment, the processor 110 may include a place extraction/non-extraction decision unit 111a, a place-associated information processor 111 and a transmission controller 112.

The place extraction/non-extraction decision unit 111a, the place-associated information processor 111 and the transmission controller 112 of the processor 110 may be physically or logically separated from each other. In other words, the place-associated information processor 111 and the transmission controller 112 may be implemented by different semiconductor chips constructing the processor 110, so that the place-associated information processor 111 and the transmission controller 112 may be physically separated from each other. The place-associated information processor 111 and the transmission controller 112 may be implemented by one semiconductor chip and may be virtually separated from each other. At least one of the place extraction/non-extraction decision unit 111a, the place-associated information processor 111 and the transmission controller 112 may be implemented by software by the application 131 driven by the processor 110. Therefore, it should be noted that the place extraction/non-extraction decision unit 111a, the place-associated information processor 111 and the transmission controller 112 of the processor 110 are not always physically distinguished from each other.

The place extraction/non-extraction decision unit 111a may determine whether the place-associated information processor 111 is ready to search for and extract place-associated information. In accordance with one embodiment, the place extraction/non-extraction decision unit 111a may enable the place-associated information processor 111a to extract the place-associated information according to a sender who sends a plurality of texts through a message service or the like. In this case, the sender may be an additional terminal device 11 or 12, or may be a user who manipulates the additional terminal device 11 or 12.

As described above, the additional terminal devices (11, 12) may transmit information for identifying the sender or information for identifying the terminal devices (11, 12) to the terminal device 100 according to user manipulation. The place extraction/non-extraction decision unit 111a may determine the sender who transmits the text using information for identifying the sender or using information for identifying the terminal devices (11, 12). Subsequently, the place extraction/non-extraction decision unit 111a may determine whether the place-associated information processor 111 is scheduled to extract the place-associated information according to the sender who sends the identified text.

In accordance with one embodiment, the place extraction/non-extraction decision unit 111a may read the sender list 132a stored in the storage unit 130, so that it can determine whether the place-associated information processor 111 extracts the place-associated information.

The sender list 132a may be an aggregate of data established to identify the text to be used as the place-associated information extraction target. Here, the data established to identify the text to be used as the place-associated information extraction target may include information regarding the sender, for example, a phone number or an e-mail address of the sender.

In accordance with one embodiment, the sender list 132a may be acquired by the user who directly inputs respective phone numbers or the like.

The sender list 132a may be acquired when the user of the terminal device 100 directly inputs respective phone numbers or the like.

In accordance with one embodiment, the sender list 132a may be an address book stored in the terminal device 100. In this case, the sender list 132a may be a group that has previously been classified in the address book. For example, the sender list 132a may be a family group or a friend group. In addition, the sender list 132a may be acquired when the user selects at least one phone number or the like from among a separate address book embedded in the terminal device 100. If the sender of the received text is searched for in the sender list 132a, the place extraction/non-extraction decision unit 111a may command the place-associated information processor 111 to extract the place-associated information. In contrast, if the sender of the received text is not searched for in the sender list 132a, the place extraction/non-extraction decision unit 111a may command the place-associated information processor 111 not to extract the place-associated information. In this case, the place extraction/non-extraction decision unit 111a may or may not transmit the control signal to the place-associated information processor 111, so that the place-associated information processor 111 may or may not extract the place-associated information.

In accordance with one embodiment, if the sender of the received text is searched for in the sender list 132a, the place extraction/non-extraction decision unit 111a may query the user of the terminal device 100 whether the place-associated information is extracted. In this case, the place extraction/non-extraction decision unit 111a may query the user whether the place-associated information is extracted using popup messages or the like displayed on the display unit 140 of the terminal device 100. The place extraction/non-extraction decision unit 111a may command the place-associated information processor 111 to extract the place-associated information in response to a user response to the query, or may also command the place-associated information processor 111 not to extract the place-associated information in response to a user response to the query.

The place extraction/non-extraction decision unit 111a may be omitted according to embodiments.

The place-associated information processor 111 may search for place-associated information in one or more texts received by the terminal device 100 through a message service, a messenger service or a web server, and may extract place-associated information contained in text. In this case, the place-associated information may indicate a character or symbol that represents a specific place or movement to the place. In more detail, the place-associated information may include at least one of an address, a place name, a place type, and a sender-intention text.

The address may indicate an identification (ID) number administratively defined to identify a specific place. For example, the address may include at least one of Si/Gun/Gu (e.g., city/country/district), Eum/Myeon/Dong (e.g., town), address, building name, street name, and a building number. The address extracted by the terminal device 100 may also include only some parts of the ID number being administratively defined. For example, in the case of using the address system that is comprised of Si/Gun/Gu, Eum/Myeon/Dong, and a detailed address such as a lot number, the terminal devices (11, 12) of the sender may transmit only the Eum/Myeon/Dong information or the lot number, corresponding to some parts of the address system, to the terminal device 100. In this case, the terminal device 100 may extract an address comprised of only the Eum/Myeon/Dong information or the lot number having been transmitted from the sender.

The regional name may indicate not only an address but also a name or title for designating a specific region. The regional name may include at least one of a major facility, a road or crossroad name, a station or airport name, and a specific region name typically referred by people. For example, the regional name may include Tehran-ro, Gimpo Airport, or KWTC (World Trade Center Seoul), or the like.

The place type may indicate a variety of place types or names indicating a specific region or building and a business place contained in the specific building, and the various place types or names are classified according to a predetermined reference such as characteristics or properties. For example, the place type may include a restaurant, a hotel, a station, an airport, a bus station, a gas station, a cultural asset, a historical site, a vehicle service station, etc. Besides, specific regions or buildings can be classified in various ways within the range considered by those skilled in the art, so that various place types and other names indicating the various place types may be present.

The sender intention text may indicate an expression associated with intention of the sender who transmits data such as a text to the terminal device 100 using a message service or a messenger service. In accordance with one embodiment, the sender intention text may include text including some command words that command the user who uses the navigation device 200 to move to a specific place. For example, the sender intention text may include various phrases, for example, "Come to ~~", "Go to ~~", "Do it at ~~", "Let's meet at ~~", or "I am waiting for you at ~~", each of which includes words indicating a specific place or adverb phrases associated with the specific place. In this case, various phrases may include a command-type phrase, a recommend-type phrase, or the like.

In accordance with one embodiment, the place-associated information processor 111 may decompose the received text into one or more words, and may search for the place-associated information in the decomposed result.

In accordance with one embodiment, the place-associated information processor 111 may search for place-associated information in one or more texts using a database (DB) 132b stored in the storage unit 130.

The place-associated information processor 111 may decompose the received text into one or more words, may search for the decomposed words in the DB 132b, or may select only words retrieved from the DB 132b from among the decomposed words, so that the place-associated information processor 111 may extract the place-associated information from the received text.

The DB 132b may include an address database (DB). When the address is extracted, the place-associated information processor 111 may use the address DB as necessary.

The DB 132b may include a Point of Interest (POI) database. The POI database may indicate a database comprised of a plurality of POIs. The POI may indicate data regarding a target that is displayed as coordinates on an electronic map. In this case, the target may indicate a specific land, a specific building, a road, a specific business place, or major facility. For example, the place-associated information processor 111 may use the POI database when the region name or place type is extracted.

The database (DB) 132b may include a sender intention text database. If the sender intention text is extracted, the place-associated information processor 111 may also use the sender intention text database.

The place-associated information processor 111 may independently or sequentially extract an address, a region name, a place type, and a sender intention text from the received text. For example, the place-associated information processor 111 may sequentially extract the address, the region name, the place type, and the sender intention text. If any one of the place-associated information including the address, the region name, the place type, and the sender intention text is extracted from the text, the place-associated information processor 111 may not extract other place-associated information any longer.

As described above, the place-associated information processor 111 may or may not extract an address, a region name, a place type, a sender intention text, etc. from the received text according to the decision result of the place extraction/non-extraction decision unit 111a.

If the place-associated information is extracted by the place-associated information processor 111, the transmission controller 112 may transmit the extracted place-associated information to the navigation device 200. If the place-associated information is not extracted, the transmission controller 112 may determine that the received text is irrelevant to the destination and may then discard the received text.

In accordance with one embodiment, the transmission controller 112 may transmit all parts of the received text or the extracted place-associated information to the navigation device 200 according to the extracted place-associated information. For example, if the extracted place-associated information is an address or a region name, the transmission controller 112 may transmit only the extracted address to the navigation device 200. In another example, if the extracted place-associated information is the region name, the place type, or the sender intention text, the transmission controller 112 may transmit the received text to the navigation device 200 without change.

In addition, the transmission controller 112 may decide whether to transmit all parts of the received text according to a connection state between the terminal device 100 and the navigation device 200, or may decide whether to transmit the extracted place-associated information according to a connection state between the terminal device 100 and the navigation device 200. For example, if the terminal device 100 can communicate with the navigation device 200, the transmission controller 112 may transmit all parts of the received text or the extracted place-associated information to the navigation device 200 through the communication unit 120. If it is impossible for the terminal device 100 to communicate with the navigation device 200, the transmission controller 112 may store all parts of the received text or the extracted place-associated information in the storage unit 130. After the terminal device 100 is able to communicate with the navigation device 200, the transmission controller 112 may transmit all parts of the received text or the extracted place-associated information to the navigation device 200 through the communication unit 120.

In addition, the transmission controller 112 may decide whether to transmit all parts of the received text to the navigation device 200 using a certain scheme, or may decide whether to transmit the extracted place-associated information to the navigation device 200 using a certain scheme. For example, the transmission controller 112 may determine which one of schemes will be used for communication between the terminal device 100 and the navigation device 200 during data transmission, may transmit signals to at least one of a short-range communication module 121, a mobile communication module 122, and a connection port of the communication unit 120 according to the determined result, and may transmit all parts of the received text or the extracted place-associated information to the navigation device 200. In another example, under the condition that the terminal device 100 is connected to the navigation device 200 through a communication cable so as to communicate with the navigation device 200 and at the same time wirelessly communicate with the navigation device 200 using the short-range communication module 121, the transmission controller 112 may select any one of the terminal device 100 and the navigation device 200, and may transmit all parts of the received text or the extracted place-associated information to the navigation device 200 according to the selected result.

In addition, the transmission controller 112 may further transmit information on the sender who sends a text to the navigation device 200. In other words, the transmission controller 112 may manipulate the additional terminal devices (11, 12) such as a smartphone or desktop computer, and may further transmit information on a user, who has transmitted text or the like to the terminal device 100, to the navigation device 200. The sender information along with all parts of the text or information associated with the extracted place may be transmitted to the navigation device 200, or may also be transmitted to the navigation device 200 separately from all parts of the text or the extracted place-associated information.

In addition, before the transmission controller 112 transmits the text or the extracted place-associated information to the navigation device 200, the transmission controller 112 may display a message needed for querying user intention on the display unit 140. In this case, the message for querying the user intention may also be displayed in the form of a popup message on the display unit 140.

ROM and/or RAM 119 may temporarily or non-temporarily store data therein to assist the operation of the processor 110, or may store a variety of commands associated with the operation of the processor 110. After the received text or the place-associated information extracted from the place-associated information processor 111 may be temporarily stored in the RAM 119, the received text or the place-associated information may also be applied to the navigation device 200 through the communication unit 120.

The communication unit 120 may transmit a variety of requests, commands, and text data to the navigation device 200 or the server devices (10, 20, 30) over wireless communication, or may receive data such as a text from the navigation device 200 or the server devices (10, 20, 30) over wireless communication.

The terminal device 100 may receive a short message service (SMS), a multimedia message service (MMS), a messenger service, a social network service (SNS), a telematics service, or text data transmitted by a Web page using the communication unit 120, or may transmit all parts of text data or the place-associated information extracted from the text data to the navigation device 200.

In accordance with one embodiment, as can be seen from FIG. 3, the communication unit 120 may include a short-range communication module 121, for example, Bluetooth, Bluetooth low energy, infrared data association (IrDA), Wireless Fidelity (Wi-Fi), Wi-Fi Direct, Ultra Wideband (UWB), Zigbee or Near Field Communication (NFC), etc. The communication unit 120 may further include a mobile communication module 122 based on 3GPP, 3GPP2 or IEEE wireless communication technology, for example, Code Division Multiple Access (CDMA), Wibro, High Speed Packet Access+ (HSPA+), or Long-Term Evolution (LTE), etc. The communication unit 120 may include a Global Positioning System (GPS) receiver 123 that communicates with the artificial satellite 40 and receives coordinate data based on GPS. Each of the short-range communication module 121, the mobile communication module 122, and the GPS receiver 123 may include a communication chip that is capable of performing a variety of data processes needed for communication; and an antenna for converting radio waves into electrical signals or converting the electrical signals into radio waves.

The storage unit 130 may store a variety of data related to the terminal device 100. Needless to say, the storage unit 130 may also store data irrelevant to the terminal device 100 therein. The storage unit 130 may include a semiconductor memory device for storing data using a semiconductor chip or a magnetic disc storage unit for storing data by magnetizing the surface of a magnetic disc.

The storage unit 130 may store the application 131 driven by the processor 110 and a variety of databases (DBs) 132. As described above, the processor 110 may drive the application 131 so that the processor 110 may extract the place-associated information or may perform a transmission control function. In addition, the processor 110 may read data stored in the DB 132 so that the processor 110 may extract the place-associated information from text data.

The display unit 140 may display a variety of data stored in the terminal device 100. In accordance with one embodiment, the display unit 140 may display a message needed for querying user intention before transmitting the text or the extracted place-associated information. The display 140 may display a message (such as a popup message) for querying user intention.

In accordance with one embodiment, the display unit 140 may include a touchscreen panel 141. The touchscreen panel 141 may receive a predetermined command in response to a touch action of the user. For example, if the popup message related to information transmission is displayed using the touchscreen panel 141, the user touches a virtual confirmation button displayed along with the popup message so that information transmission of the terminal device may be approved.

The input unit 142 may output an electric signal corresponding to user handling to the processor 110 or the like. The user may handle or manipulate the terminal device 100 as he or she wishes in response to a manipulation of the input unit 142. For example, if the popup message related to information transmission is displayed on the display unit 140, the user may approve information transmission of the terminal device 100 by manipulating the input unit 142.

The sound output unit 150 may convert an electric signal into a sound signal under the control of the processor 110, and may output the sound signal to the outside. The sound output unit 150 may include a speaker, associated semiconductor chips or associated circuits as necessary. In accordance with one embodiment, the sound output unit 150 may audibly inform the user of information as to whether the place-associated information is extracted, information as to whether the place-associated information is transmitted, or information as to whether the popup message related to information transmission is displayed, so that the user can recognize the above information through sound signals.

The connection port 160 may be installed at one end of the communication cable. A connector may be coupled to the connection port 160. The connection port 160 may serve as a transmission path through which data generated from the terminal device 100 is applied to the external device (e.g., the navigation device 200) or data generated from the navigation device 200 is applied to the terminal device 100. The connection port 160 may include a universal serial bus (USB), a micro universal serial bus or a display port, a High Definition Multimedia Interface (HDMI) port, a Digital Visual Interface (DVI) port, a Unified Display Interface (UDI) port, etc. The connection port 160 may also be used as a power-supply terminal.

Figure 4:
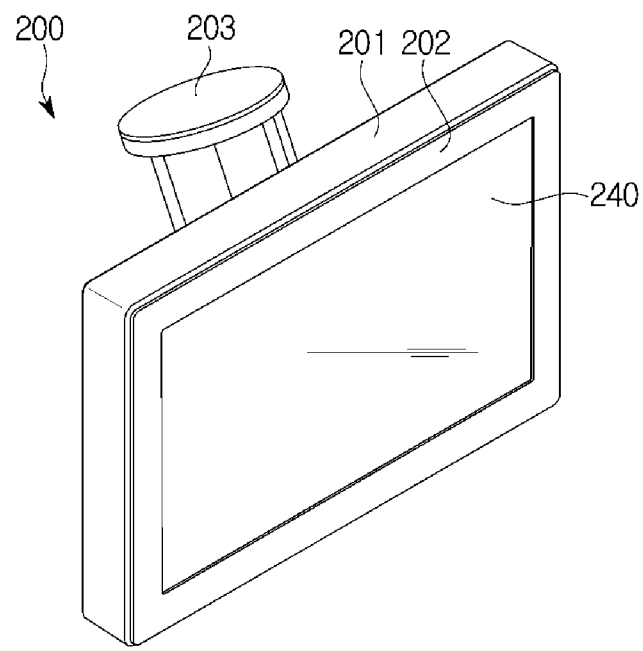
FIG. 4 is a perspective view illustrating a navigation device according to an embodiment of the present invention.
Figure 5:
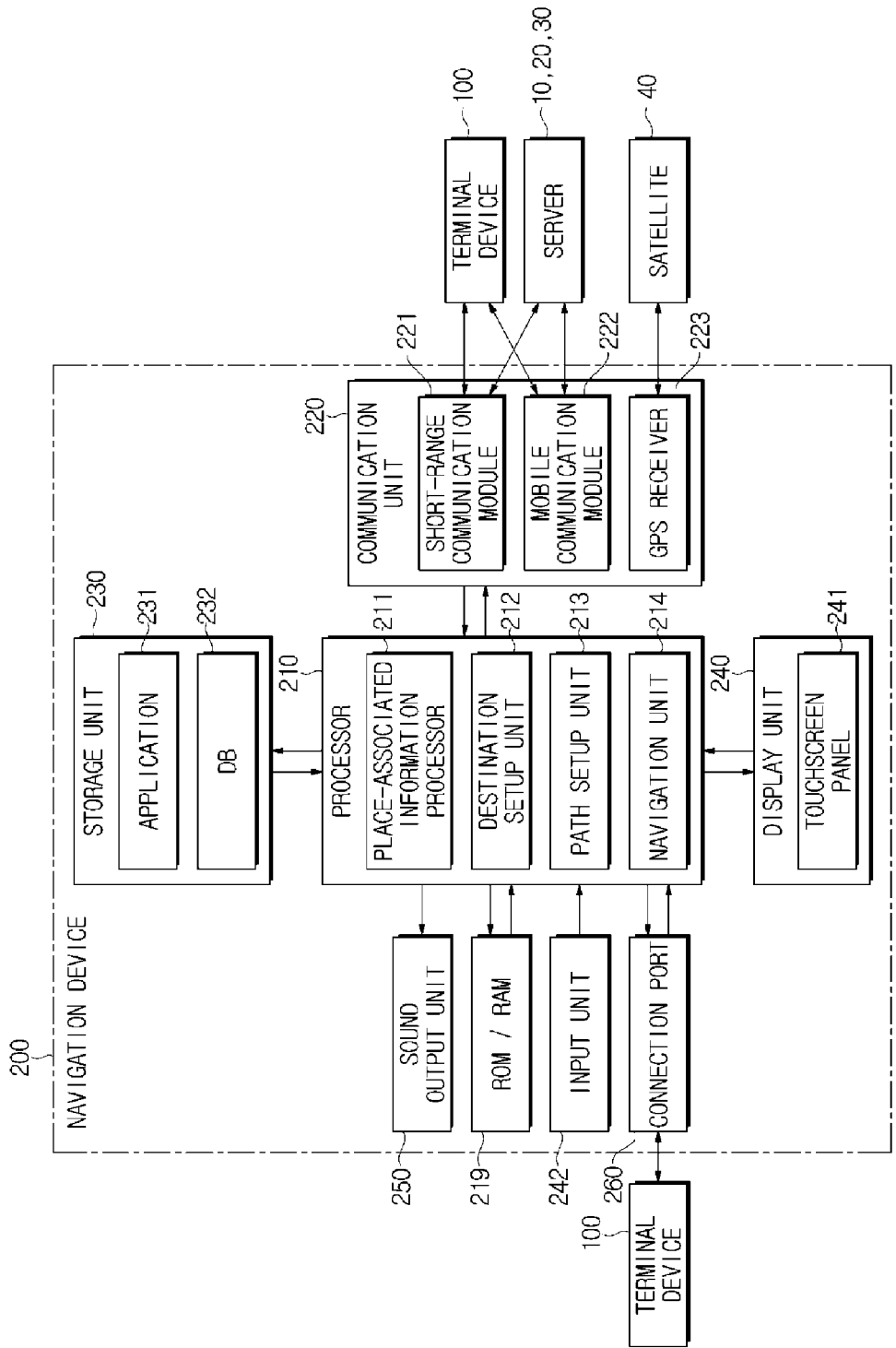
FIG. 5 is a block diagram illustrating a navigation device according to an embodiment of the present invention.

FIG. 4 is a perspective view illustrating a navigation device according to an embodiment of the present invention. FIG. 5 is a block diagram illustrating a navigation device according to an embodiment of the present invention. Although FIG. 4 illustrates one example of the navigation device 200 fabricated separately from other devices for convenience of description and better understanding of the present invention, the scope or spirit of the navigation device 200 is not limited thereto, and various types of navigation devices well known to those skilled in the art may also be used as an example of the navigation device 200.

The navigation device 200 may be a device that is capable of providing a user with various kinds of information. For example, the navigation device 200 may provide the user with information regarding the position of the navigation device, a current position of the user, a peripheral region of the current position, positions other than the current position, or the path toward the destination, through an electronic map.

In accordance with one embodiment, the navigation device 200 may determine the position of the navigation device 200 using GPS coordinates received from the satellite 40, may detect a position corresponding to the determined position from the electronic map, and may display the electronic map and the corresponding position marked on the electronic map on the display unit 240. In addition, after at least one path is decided using the corresponding position or the POI marked on the electronic map, the navigation device 200 may perform navigation on basis of the decided path.

Referring to FIG. 4, the navigation device 200 may include an external housing 201 that includes a variety of electronic components and secures the electronic components to an interior part; and a display unit 240 mounted to a front surface 202 of the external housing 201. In accordance with one embodiment, the input unit 242 (See FIG. 5) such as a physical button or knob may be mounted to the external housing 201.

In the same manner as in the terminal device 100, electronic components embedded in the external housing 201 of the navigation device 200 may include a printed circuit board (PCB), a semiconductor chip (such as a processor chip or a communication chip) mounted to the PCB, a memory device such as a Secure Digital (SD) card, a battery, a variety of wirings or lines, etc. In accordance with the embodiment, the external housing 201 of the navigation device 200 may include a power-supply terminal through which the battery is charged with electricity or respective components are powered on.

Referring to FIG. 5, the navigation device 200 may include a processor 210, a ROM and/or RAM 219, a communication unit 220, a storage unit 230, a display unit 240, an input unit 242, a sound output unit 250, and a connection port 260. In accordance with the embodiment, some parts of the above-mentioned components may be omitted as necessary.

The processor 210 may control overall operations of the navigation device 200, and may process a variety of calculations needed for operating the navigation device 200. For example, the processor 210 may drive one or more applications 231 installed into the navigation device 200 in such a manner that the processor 210 may control the operation of the navigation device 200. The processor 210 may be implemented by one or more processors mounted to the PCB embedded in the external housing 201. For example, the processor 210 may include a Central Processing Unit (CPU) or Graphic Processing Unit (GPU) mounted to the PCB.

Referring to FIG. 5, the processor 210 may include a place-associated information processor 211, a destination setup unit 212, a path setup unit 213, and a navigation unit 214 (also called a path guiding unit).

The place-associated information processor 211, the destination setup unit 212, the path setup unit 213, and the navigation unit 214 may be physically or logically separated from each other in the same manner as in the terminal device 100. In other words, the place-associated information processor 211, the destination setup unit 212, the path setup unit 213, and the navigation unit 214 may be respectively implemented by the semiconductor chips physically separated from each other, or may also be virtually implemented by one semiconductor chip. At least one of the place-associated information processor 211, the destination setup unit 212, the path setup unit 213, and the navigation unit 214 may also be implemented by software by the application 231 driven by the processor 210.

The place-associated information processor 211, the destination setup unit 212, the path setup unit 213, and the navigation unit 214 may perform necessary operations corresponding to the application 231 driven by the processor 210.

If the navigation device 200 receives the entire text from the terminal device 100, the place-associated information processor 211 of the navigation device 200 may search for the place-associated information in the received text, and may extract the place-associated information contained in the text. In the same manner as described above, the place-associated information may include at least one of an address, a region name, a place type, and a user-intention text. In this case, the address, the region name, the place type, and the user-intention text for use in the navigation device 200 may be identical to those of the terminal device 100.

The place-associated information processor 211 may decompose the received text into one or more words, and may search for the place-associated information in the decomposed result. In accordance with one embodiment, the place-associated information processor 211 may further use the database (DB) 232 stored in the storage unit 230.

In accordance with one embodiment, the place-associated information processor 211 may decompose the received text into one or more words, may search for the decomposed words in the DB 232, may select only words retrieved from the DB 232 from among the decomposed words, and may extract the place-associated information from the received text.

In the same manner as in the terminal device 100, the DB 232 of the navigation device 200 may include at least one of an address database (DB), a POI database (DB), and a sender-intention text DB. The place-associated information processor 211 may extract an address, a region name, a place type or a sender intention text using respective databases (DBs).

The place-associated information processor 211 may separately or sequentially extract the address, the region name, the place type, and the sender intention text from the received text. For example, the place-associated information processor 211 may sequentially extract the address, the region name, the place type, and the sender intention text. If necessary, if any one of the address, the region name, the place type, and the sender intention text is extracted from the text, the place-associated information processor 211 may not extract other place-associated information any longer.

The place-associated information processor 211 may control the extracted result using the display unit 240 or the sound output unit 250, may display the control result for user recognition on the display unit 240 or may audibly output the control result using the sound output unit 250. In this case, the place-associated information processor 211 may query the user whether or not the extracted result is correct. In other words, the place-associated information processor 211 may query the user on whether or not the place-associated information is correctly extracted from the text. In this case, this query information may be visually displayed in the form of letters or images on the display unit 240 or may be audibly output in the form of a sound signal through the sound output unit 250, so that the user can visually and audibly recognize the above query information.

If the navigation device 200 receives the place-associated information from the terminal device 100, the place-associated information processor 211 of the navigation device 200 may not extract the place-associated information from the text. Therefore, the place-associated information processor 211 may be omitted as necessary.

The destination setup unit 212 may establish a designation on a navigation path using either the place-associated information received from the terminal device 100 or the other place-associated info' illation extracted from the place-associated information processor 211.

In accordance with one embodiment, if the place-associated information received from the terminal device 100 or the other place-associated information extracted from the place-associated information processor 211 is the address or the region name, the destination setup unit 212 may determine the extracted address or region name to be a destination without change.

In accordance with another embodiment, if the place-associated information received from the terminal device 100 or the other place-associated information extracted from the place-associated information processor 211 is the place type, the destination setup unit 212 may select one or more POIs from among a plurality of POIs corresponding to the extracted place types according to a predetermined condition, and may then determine the selected POI to the destination.

In this case, the destination setup unit 212 may determine the POI located closest to a current position from among the POIs corresponding to the place types to be a destination, and may determine a specific POI located in the predefined region to be a destination. Alternatively, a user-selected POI from among the POIs corresponding to the place types may be set to a destination. In this case, if the user-selected POI is set to the destination, the destination setup unit 212 controls the display unit 240 or the sound output unit 250 so that a message that requests a user to establish a POI may be output in the form of any one of a text, an image, and a sound. Information as to which POI will be selected from among a plurality of POIs by the destination setup unit 212 may be based on either the user selection or the predefined setting information.

Figure 6A:
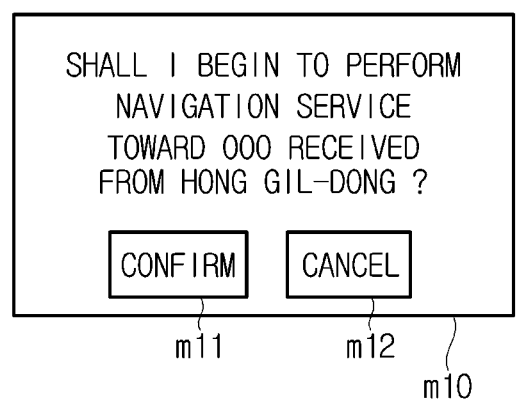
FIGS. 6A to 6C illustrate exemplary messages displayed in association with path setting.
Figure 6B:
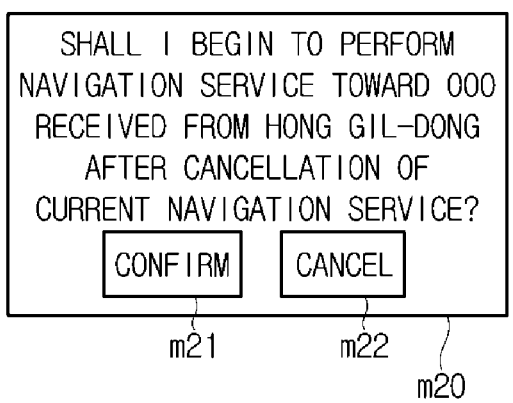
Figure 6C:

FIGS. 6A to 6C illustrate exemplary messages displayed in association with path setting.

In accordance with one embodiment, before the address or POI obtained from the extracted region-associated information is set to the destination, the destination setup unit 212 may query the user whether the destination will be established or changed. In this case, the destination setup unit 212 may output different queries according to the operation of the navigation device 200.

For example, if the navigation device 200 does not perform a navigation service when setting the destination, the destination setup unit 212 may query the user whether to establish the destination according to the place-associated information.

In accordance with one embodiment, the destination setup unit 212 controls the display unit 240 to display a predetermined popup message (m10), so that the destination setup unit 212 can query the user whether to establish the destination according to the place-associated information. For example, as can be seen from FIG. 6A, the display unit 240 may display the popup message (m10) including predetermined words on the screen in response to a control signal received from the destination setup unit 212. In this case, the predetermined words may indicate a question for inquiring whether to initiate a navigation service for the address or POI sent from the sender. The popup message (m10) may include one or more guides (m11, m12) for directing user selection. The one or more guides (m11, m12) may indicate approval or denial of the navigation service (i.e., the path guiding service). If the navigation device 200 includes a touchscreen panel 241, the user may touch any one of the guides (m11, m12) of the popup message (m10), may approve destination setting according to the place-associated information, or may reject or cancel the destination setting. Besides, the user may approve the destination setting according to the place-associated information by handling a separate input unit 242 or the like, or may reject the destination setting.

In accordance with one embodiment, the destination setup unit 212 may control the sound output unit 250 to output a predetermined sound, so that the destination setup unit 212 may query the user whether to establish the destination according to the place-associated information.

If the destination is established according to user approval, the display unit 240 may display a popup message (m30) shown in FIG. 6C illustrating that the destination setting is completed and the navigation service is initiated according to the established destination.

In another example, assuming that the navigation device 200 is performing the navigation service and the legacy destination is different from a new destination based on the place-associated information, the destination setup unit 212 may set the place obtained by the place-associated information to a new destination, and may query the user whether to change a current path to another path according to the resultant destination.

In the same manner as in the above-mentioned description, as shown in FIG. 6B, the destination setup unit 212 controls the display unit 240 to display a predetermined popup message (m20), and may query the user whether to change the destination according to the place-associated information. For example, the display unit 240 may display the popup message (m20) including contents related to a destination change and a path change on the screen, upon receiving a control signal from the destination setup unit 212. The popup message (m20) may include one or more guides (m21, m22) for directing user selection, and the respective guides (m21, m22) may indicate the approval or denial of the destination change or the path change.

In addition, the destination setup unit 212 may transmit a control signal to the sound output unit 250, and may control the sound output unit 250 to output a predetermined sound, so that the destination setup unit 212 may query the user whether the destination or path will be changed according to the place-associated information.

In another example, assuming that the navigation device 200 is performing the navigation service and the legacy destination is identical to a new destination based on the place-associated information, the destination setup unit 212 does not change the legacy destination or path and can maintain the legacy destination or path. In this case, the display unit 240 does not display an additional popup message, or the sound output unit 250 does not output any sound.

The path setup unit 212 may decide on one or more paths using the current position information of the navigation device 200 and the destination information. The current position information may include coordinate values of the current position, and the destination information may include coordinate values of the destination. The destination may be obtained in response to the place-associated information.

The path setup unit 212 may establish a path toward the destination in various ways. For example, the path setup unit 212 may establish a specific path having the shortest traveling distance to the path toward the destination. The path having the shortest traveling time may be set to the path toward the destination. In addition, the path setup unit 212 may first consider the road (e.g., expressway) on which the vehicle can run at a high speed, and may establish the path toward the destination according to the above consideration. If several paths are established, the path setup unit 213 may select any one of plural paths according to the user selection or the predefined setting.

If the navigation device 200 is located at a position out of the predetermined path, the path setup unit 213 may re-determine one or more paths using the current position information of the navigation device 200 and the destination information.

The navigation unit 214 (also called "path guiding unit") may inform a user of one path established by the path setup unit 213 and the other path using the current position of the navigation device 200. In this case, the navigation unit 214 controls the display unit 240 and the sound output unit 250, so that the navigation unit 214 may provide the user with the path information. If the position of the navigation device 200 deviates from the path, the navigation unit 214 may control the display unit 240 and the sound output unit 250 to output a path separation warning message.

ROM and/or RAM 219 may temporarily or non-temporarily store data to assist the operation of the processor 110, or may store a variety of commands related to the processor 110.

The communication unit 220 may receive text and/or data such as the place-associated information from the navigation device 200 or the telematics server device 30 over wireless communication.

In accordance with one embodiment, as can be seen from FIG. 5, the communication unit 220 may include at least one of the short-range communication module 221, the mobile communication module 222, and the GPS receiver 223.

The short-range communication module 221, the mobile communication module 222, and the GPS receiver 223 shown in FIG. 5 may be identical to those of FIG. 3, or may be partially different from those of FIG. 3 within a technical scope known to those skilled in the art.

The storage unit 230 of the navigation device 200 may store a variety of data related to the navigation device 200. Needless to say, the storage unit 230 may store data irrelevant to the navigation device 200 in response to situations.

The storage unit 230 may be implemented by a semiconductor memory device configured to store data using a semiconductor chip or may also be implemented by a magnetic disc storage unit configured to store data by magnetizing the surface of a magnetic disc.

In the same manner as in FIG. 3 or in different ways within the technical scope known to those skilled in the art, the storage unit 230 may store the application 231 driven by the processor 210 and a variety of databases (DBs) 232.

The display unit 240 may display a variety of data stored in the navigation device 200. In accordance with one embodiment, the display unit 240 may display letters or images including the question indicating whether the text or the extracted place-associated information is correctly extracted. In addition, the question indicating whether the destination will be established or changed may be displayed in the form of letters or images. In addition, for user recognition, the display unit 240 may display letters or images indicating that the destination has been changed. The display unit 240 may display a message for querying user intention in the form of a popup message or the like.

In accordance with one embodiment, the display unit 240 may include a touchscreen panel 241 configured to receive a predetermined command in response to a user touch action. If the display unit 240 displays the popup message indicating whether the destination will be established or changed, the user touches a virtual confirmation button displayed along with the popup message in such a manner that the user may select the destination setting or may also select whether the destination is changed.

The input unit 242 may output electric signals in response to the user manipulation, and may transmit the electric signals to the processor 210 or the like. In accordance with one embodiment, if the display unit 240 displays the popup message indicating whether the destination will be established or the destination will be changed, the user who manipulates the input unit 242 may establish the destination or may also decide to change the destination.

The sound output unit 250 may convert the electric signal into a sound signal under the control of the processor 210, and may output the sound signal to the outside.

In accordance with one embodiment, the sound output unit 250 may audibly output information as to whether the place-associated information is extracted and information as to whether the destination will be established or changed, so that the user can recognize the above information through a sound signal.

A connection port 260 is installed at one end of a communication cable. A connector may be coupled to the connection port 260. The navigation device 200 may receive data generated from the terminal device 100 using the communication cable coupled to the connection port 260. As can be seen from FIG. 3, the connection port 260 may be implemented by various kinds of ports. As described above, the connection port 260 may be used as a power-supply terminal through which the battery of the navigation device 200 is charged with electricity or respective components of the navigation device 200 are powered on.

Referring to FIG. 4, a predetermined-shaped stand (or cradle) 203 may be contained in the navigation device 200. The stand 203 may be installed at the front or lateral surface of the navigation device 200 or may also be installed at the back surface of the navigation device 200 as shown in FIG. 4. One end of the stand 203 may be coupled to the navigation device 200, and the other end of the stand 203 may be attached to a predetermined part of the vehicle. For example, the other end of the stand 203 may be attached to one surface of the windshield 330 (See FIG. 6) of the vehicle 300, or may be attached to an upper end of a dashboard 301. The navigation device 200 may be fixed to a predetermined part of the vehicle using the stand 203.

Figure 7:
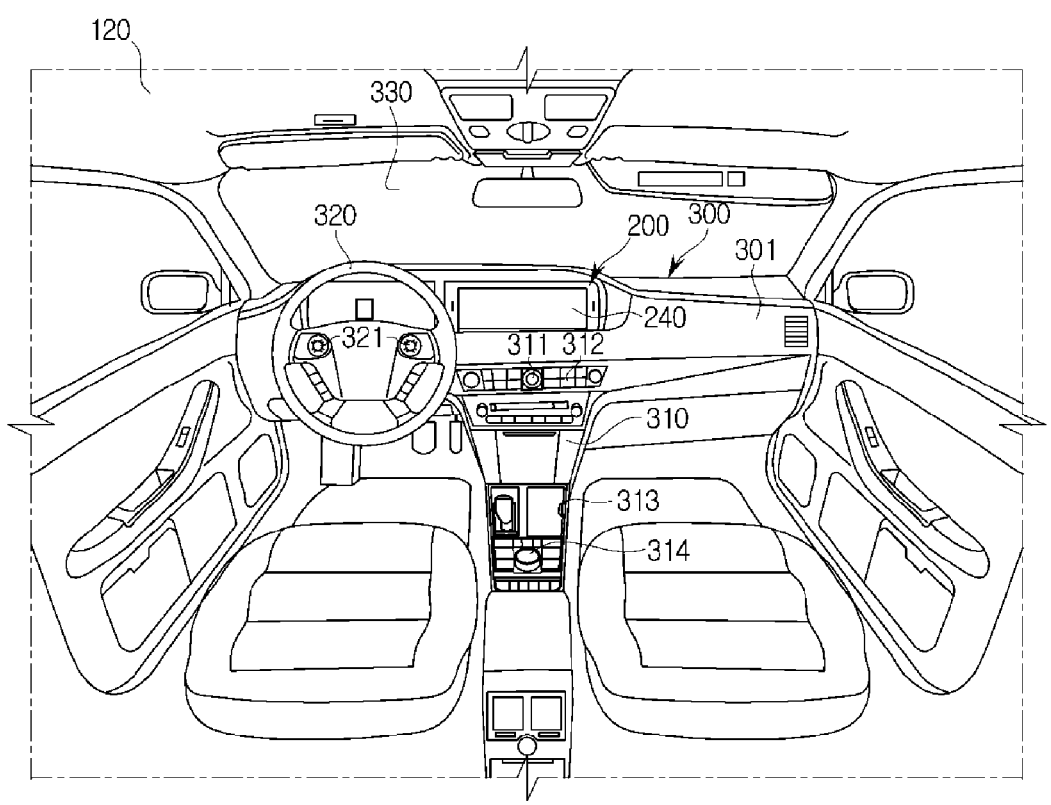
FIG. 7 is a view illustrating an internal structure of a vehicle including a navigation device according to an embodiment of the present invention.

FIG. 7 is a view illustrating the internal structure of a vehicle including a navigation device according to an embodiment of the present invention.

Referring to FIG. 7, a dashboard 300 serves to separate the interior of the vehicle from an engine room, is installed at the front of the driver's seat and the passenger seat, and includes a plurality of electronic components needed for vehicle driving. The dashboard 300 may include a top panel (i.e., gauge panel) 301, a center console (center fascia) 310, a gear box 230, etc.

In accordance with one embodiment, as shown in FIG. 6, the navigation device 200 may be buried in the top panel 301 of the dashboard 300 in such a manner that a display panel and a bezel located in the vicinity of the display panel can be exposed. In accordance with another embodiment, the navigation device 200 may also be installed at the center console 310. Needless to say, the navigation device 200 may also be installed at one surface of the windshield or at the top of the dashboard 300.

Various electronic components (for example, a microprocessor, a communication module, a GPS reception module, a storage unit, etc.) for controlling electronic devices installed in the vehicle 2 may be installed at the interior of the dashboard 300. The microprocessor installed in the vehicle may control the navigation device 200. For example, various electronic components may be implemented by at least one of a semiconductor chip, a switch, an Integrated Circuit (IC), a resistor, a volatile or non-volatile memory, a PCB, etc.

The input units (311, 312, 314) for inputting various commands may be mounted to the center console 310 or the gear box 313 of the vehicle 2. The input units (311, 312, 314) may include a physical button, a knob, a touchpad, a touchscreen, a stick-type manipulation device, or a track ball, etc. The user may input an operation command of the navigation device 200 by manipulating the input units (311, 312, 314).

A steering wheel 320 may be provided to the vehicle 2, and an input unit 321 for inputting various commands may also be provided to a spoke of the steering wheel 320. The input unit 321 may include a physical button, a knob, a touchpad, a touchscreen, a stick-type manipulation device, or a track ball, etc. The user may input a command for the navigation device 200 by manipulating the input unit 320 mounted to the steering wheel 320.

The navigation device 200 installed in the vehicle 2 may display a current position of the vehicle on the electronic map as described above, or may perform a navigation service according to a current vehicle position or destination. The navigation device 200 installed in the vehicle 2 may establish a destination according to either the place-associated information received from the terminal device 100 or the other place-associated information detected from the text received from the terminal device 100. In this case, at least one of the processor 210, the ROM and/or RAM 219, the communication unit 220, the storage unit 230, the display unit 240, the input unit 242, the sound output unit 250, and the connection port 260 in the navigation device 200 shown in FIG. 5 may be replaced with a microprocessor, a communication module, a GPS reception module, a storage unit, a vehicle display device such as a vehicle television or electronic instrument panel, various input units (311, 312, 314, 321), a sound output unit such as a speaker, a connection port, etc. In other words, at least one of the microprocessor, the communication module, the GPS reception module, the storage unit, the vehicle display device such as a vehicle television or electronic instrument panel, various input units (311, 312, 314, 321), the sound output unit such as a speaker, and a connection port may also perform at least one function from among the processor 210, the ROM and/or RAM 219, the communication unit 220, the storage unit 230, the display unit 240, the input unit 242, the sound output unit 250, and the connection port 260.

A method for inputting a desired place to the navigation device according to the embodiments will hereinafter be described with reference to FIGS. 8 to 12.

Figure 8:
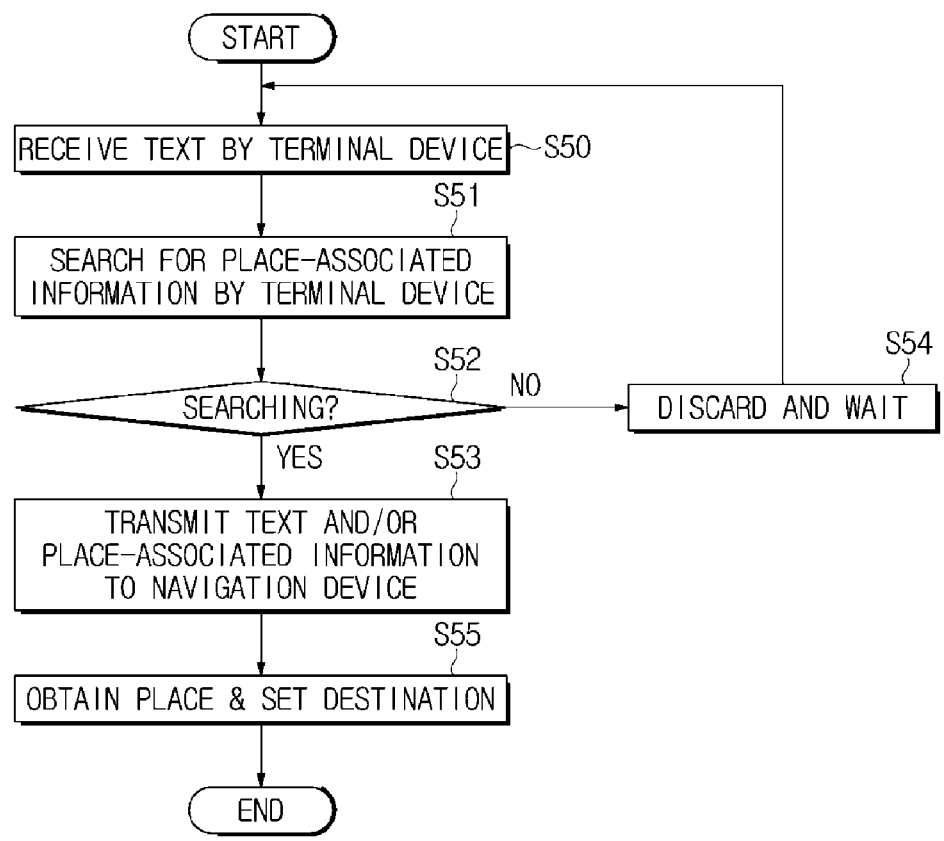
FIG. 8 is a flowchart illustrating a method for inputting a location to a navigation device according to an embodiment of the present invention.

FIG. 8 is a flowchart illustrating a method for inputting a location to a navigation device according to an embodiment of the present invention.

Referring to FIG. 8, according to the method for inputting a place to the navigation device according to one embodiment, the terminal device may receive data such as text from an external part in operation S50. Here, the terminal device may receive text data using at least one of a short message service (SMS), a multimedia message service (MMS), a messenger service, a Web browser, a social network service, and a telematics service.

If the terminal device receives data such as a text, the terminal device may analyze the text or other data, and may perform a searching process to recognize whether the place-associated information is present in data such as a text or the like in step S51. In this case, the place-associated information may include at least one of an address, a region name, a place type, and a sender intention text.

If any place-associated information is not detected from the search resultant text in operation S52, the terminal device may determine that the received text is irrelevant to the place-associated information, may discard the received text, and may wait for receiving data such as a new text in operation S54.

If the place-associated information is extracted from the search resultant text in operation S52, the terminal device may transmit at least one of the text and the extracted place-associated information to the navigation device in operation S53.

The navigation device may receive at least one of the text and the extracted place-associated information, and may extract the place-associated information by analyzing the received text. Alternatively, the navigation device may obtain a place using the place-associated information received from the terminal device, and may determine the objected place to the destination in operation S55.

A method for inputting a place to the navigation device according to the embodiments will hereinafter be described with reference to FIGS. 9 to 12.

A process executed by the terminal device for use in the above-mentioned method for inputting a place to the navigation device will hereinafter be described in detail.

Figure 9:
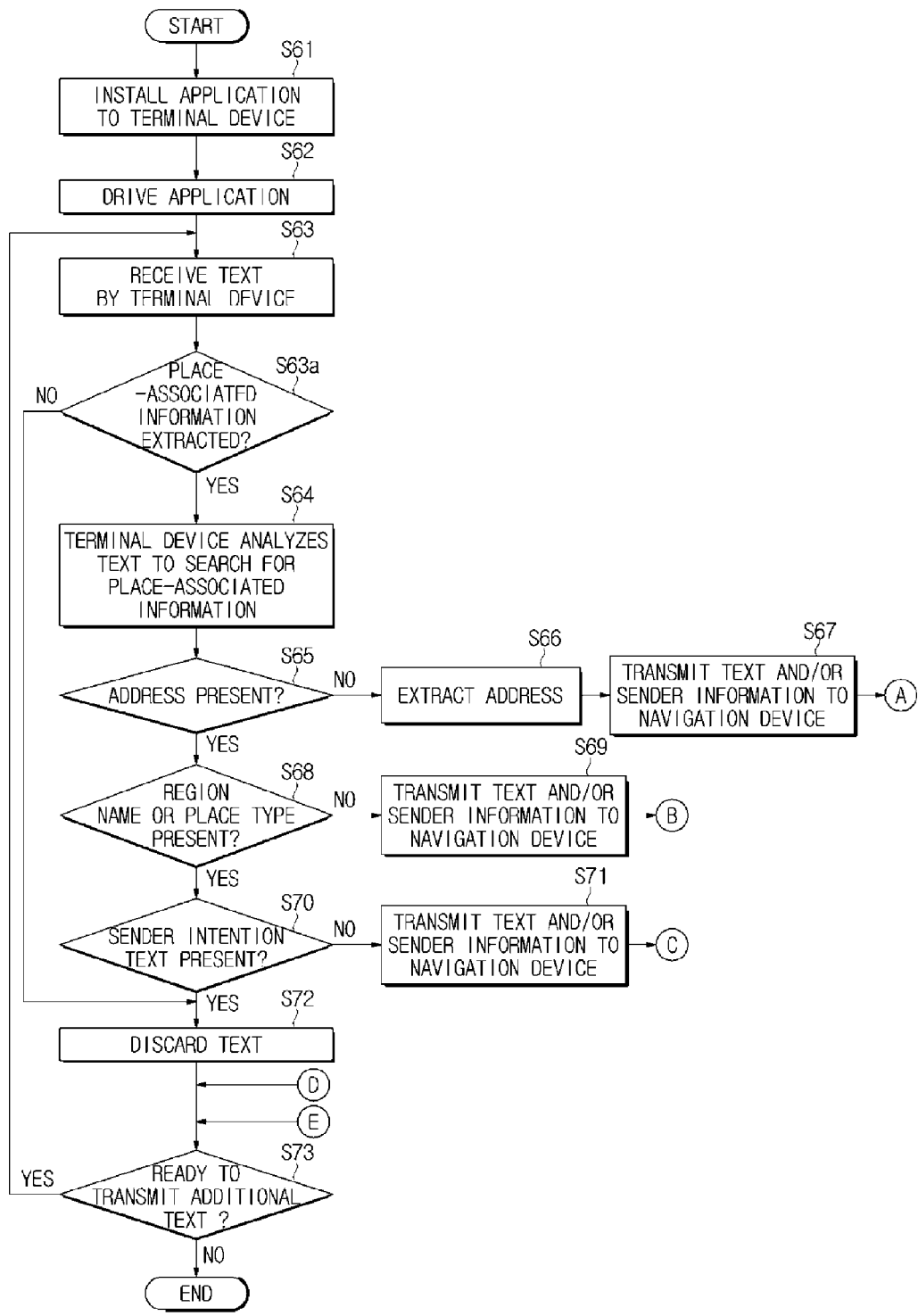
FIG. 9 is a flowchart illustrating an exemplary process executed by a terminal device for use in the method for inputting a location to the navigation.

FIG. 9 is a flowchart illustrating an exemplary process executed by a terminal device for use in the method for inputting a location to the navigation.

Referring to FIG. 9, according to the method for inputting a place to the navigation device, the application configured to perform the method for inputting a place to the navigation device may be installed at the terminal device in operation S61. The application for performing the method for inputting the place to the navigation device may be installed using an installation program applied to the terminal device through an external memory device, a wired communication network, or a wireless communication network.

If the application is completely installed in operation S61, the application may be driven in operation S62. The application may be driven by user selection or may also be driven by the predefined setting.

After the application is completely driven in operation S62, the terminal device may receive data such as a text in operation S63. In this case, data such as text may include a variety of data capable of being received using SMS, MMS, messenger service, Web browser, SNS, or telematics service. In accordance with the embodiment, the terminal device may further receive sender information indicating a sender who has transmitted data such as a text.

After reception of data, the terminal device may determine whether to extract the place-associated information in operation S63a.

In accordance with one embodiment, the terminal device may identify the sender who transmits data such as a text, and may decide whether to extract the place-associated information. For example, if the sender who has transmitted data is present in the sender list by referring to the sender list in operation S63a, the terminal device may search for the place-associated information in data such as text in operation S64. If the sender who has transmitted data is not present in the sender list by referring to the sender list in operation S63a, the terminal device may discard the received text in operation S72. Thereafter, the terminal device may wait for receiving the additional text in operation S73. The operation S63a may be omitted according to the embodiment.

If the terminal device may receive the text in operation S63 or extraction of the place-associated information is decided in operation S63a, the terminal device may analyze data such as the received data and may search for the place-associated information in data such as a text in operation S64.

The place-associated information may include at least one of an address, a region name, a place type, and a sender intention text.

If the searched place-associated information is an address or some part of the address in operation S65, the terminal device may extract the searched address or some parts of the address in operation S66, and may transmit the extracted address or some parts of the address to the navigation device in operation S67. In accordance with one embodiment, the terminal device may transmit the address, some parts of the address, and the sender information to the navigation device as necessary.

If the searched place-associated information is a region name or a place type in operation S68, the terminal device may transmit all or some parts of the received text to the navigation device in operation S69. In accordance with one embodiment, the terminal device may extract the searched region name or place type from the text, or may transmit the extracted region name or place type to the navigation device. In this case, all or some parts of the received text may also be transmitted to the navigation device along with the searched region name or place type. In accordance with one embodiment, the terminal device may transmit all or some parts of the text, or may also transmit the region name, the place type, and the sender information to the navigation device.

If the searched place-associated information is the sender intention text in operation S70, the terminal device may transmit all or some parts of the received text to the navigation device in operation S71. In accordance with one embodiment, the terminal device may extract the sender intention text from the text, and may transmit the extracted sender intention text as well as all or some parts of the received text to the navigation device. In accordance with one embodiment, the terminal device may transmit the sender intention text, all or some parts of the text, and the sender information to the navigation device.

If any place-associated information is not searched for in data such as a text, the terminal device determines that the received text is irrelevant to the place so that the terminal device may discard data such as the received text in operation S27.

The terminal device may further receive data such as a text in operation S73. In this case, the terminal device may be maintained in a standby state until receiving the additional text. Needless to say, if the above-mentioned process for the received text is completed, the application may be terminated, so that the terminal device may also finish the above-mentioned process.

Figure 10:
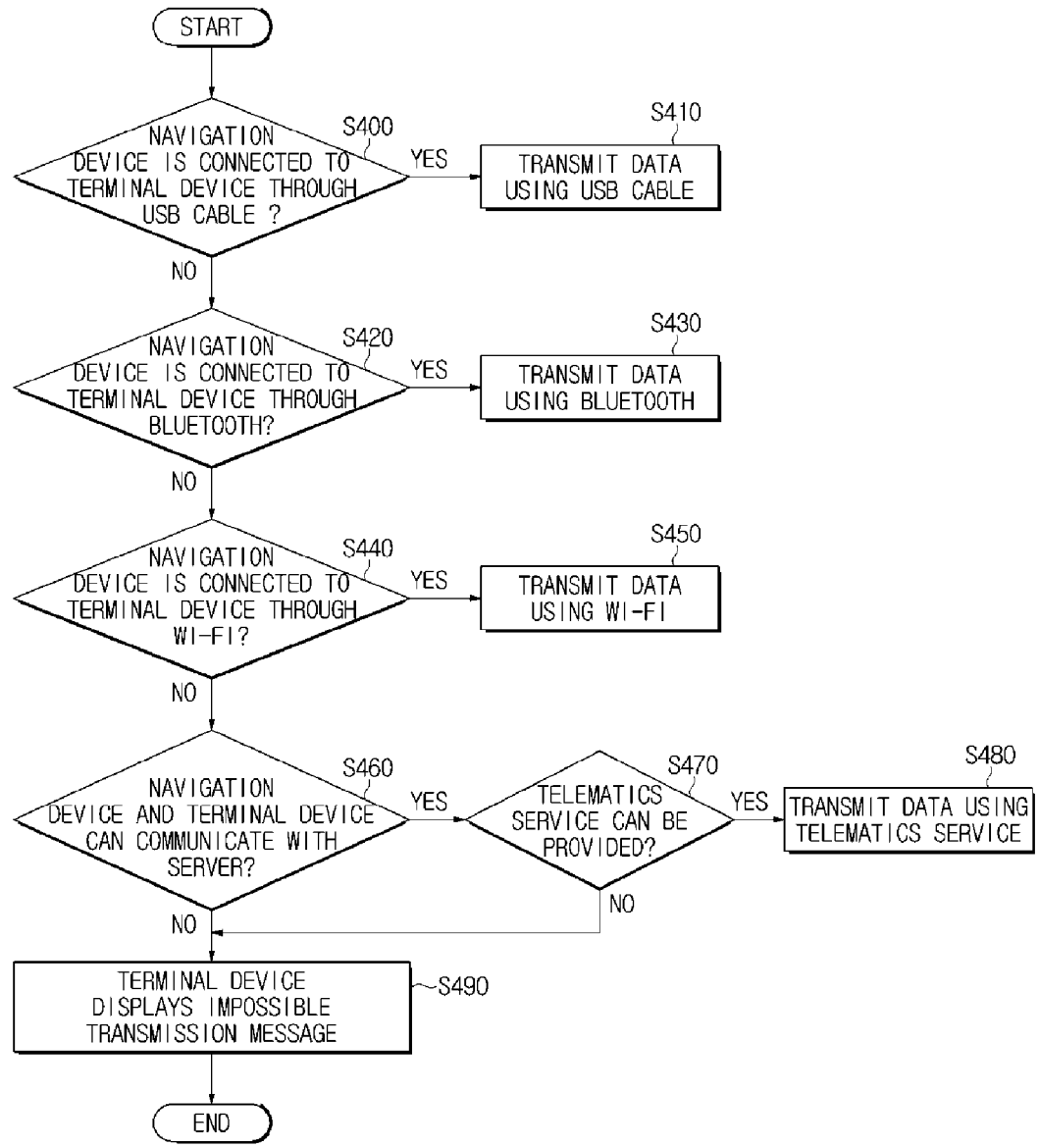
FIG. 10 is a flowchart illustrating a method for selecting connection to the navigation device by the terminal device.

FIG. 10 is a flowchart illustrating a method for selecting connection to the navigation device by the terminal device.

Referring to FIG. 10, if the terminal device transmits all or some parts of the text or the place-associated information to the navigation device, the terminal device may decide which one of transmission methods will be used to transmit all or some parts of the text or the place-associated information according to a connection state or the like. In accordance with one embodiment, the terminal device may sequentially confirm various communication units, may decide on which one of the schemes will be used to transmit all or some parts of the text or the place-associated information. In accordance with another embodiment, various communication units are confirmed in a parallel manner, so that it may be possible to determine information as to whether all or some parts of the text or the place-associated information will be transmitted. If several communication units are sequentially confirmed, the communication units may be confirmed according to a predetermined order or a random order. Here, the predetermined order may be decided according to various references, for example, a possible or impossible state of communication, a transfer rate, a transmission range, connection stability, etc.

A method for determining which communication scheme will be used by sequentially confirming several communication units will hereinafter be described with reference to FIG. 10. However, the above-mentioned method for confirming several communication units may also be implemented in a parallel manner.

Referring to FIG. 10, if the terminal device and the navigation device are interconnected through universal serial bus (USB) cables respectively coupled to USB terminals in operation S400, the terminal device may transmit all or some parts of text data of the terminal device or the place-associated information to the navigation device using the USB cable in operation S410.

If the navigation device is not connected to the terminal device through USB cables respectively coupled to USB terminals in operation S400, the terminal device may determine whether the navigation device and the terminal device are interconnected through Bluetooth communication in operation S420. If the navigation device and the terminal device are interconnected through Bluetooth communication, the terminal device may transmit all or some parts of text data of the terminal device or the place-associated information to the navigation device in operation S430.

If the navigation device and the terminal device are not interconnected through universal serial bus (USB) cables coupled to respective USB terminals and are not interconnected through Bluetooth communication in operation S420, the terminal device may determine whether the navigation device is connected to the terminal device through Wi-Fi communication in operation S440. If the navigation device is connected to the terminal device through Wi-Fi communication, the terminal device may transmit all or some parts of text data of the terminal device or the place-associated information to the navigation device through Wi-Fi communication in operation S450.

If the navigation device and the terminal device are not interconnected through the USB cables coupled to respective USB terminals, are not interconnected through Bluetooth communication, and are not interconnected through Wi-Fi communication in operation S440, the terminal device may determine whether at least one of the terminal device and the navigation device can communicate with the external server device in operation S460. If at least one of the terminal device and the navigation device can communicate with the external device, the terminal device may determine whether the telematics service is possible or not in operation S470. If the telematics service is possible, the terminal device may decide to transmit all or some parts of text data or the place-associated information using the telematics service. Therefore, the terminal device may transmit all or some parts of the text or the place-associated information to the telematics service server using the mobile communication module or the like.

The telematics service server may receive all or some parts of the text or the place-associated information, and may also transmit the received all or some parts of the text or the place-associated information to the navigation device. In this case, the telematics service server may immediately transmit all or some parts of the text or the place-associated information to the navigation device. After lapse of a predetermined time, the telematics service server may also transmit the all or some parts of the text or the place-associated information to the navigation device. If the navigation device is in a communication unavailable state, the telematics service server may store all or some parts of the text or the place-associated information. If the navigation device is in a communication possible state, all or some parts of the text or the place-associated information can be transmitted to the navigation device.

If the terminal device cannot transmit all or some parts of the text or the place-associated information to the navigation device in operation S460 or S470, the terminal device may display a message indicating an impossible transmission state on the display unit in operation S490. The above-mentioned situation in which the terminal device can transmit all or some parts of the text or the place-associated information to the navigation device as shown in FIG. 10 may indicate a specific situation in which the navigation device and the terminal device are not interconnected through the USB cable coupled to respective USB terminals, are not interconnected through Bluetooth communication, are not interconnected through Wi-Fi communication, at least one of the navigation device and the terminal device cannot communicate with the external server, and it is impossible to implement the telematics service even in a communication available state.

Processes executed by the navigation device will hereinafter be described in detail.

Figure 11:
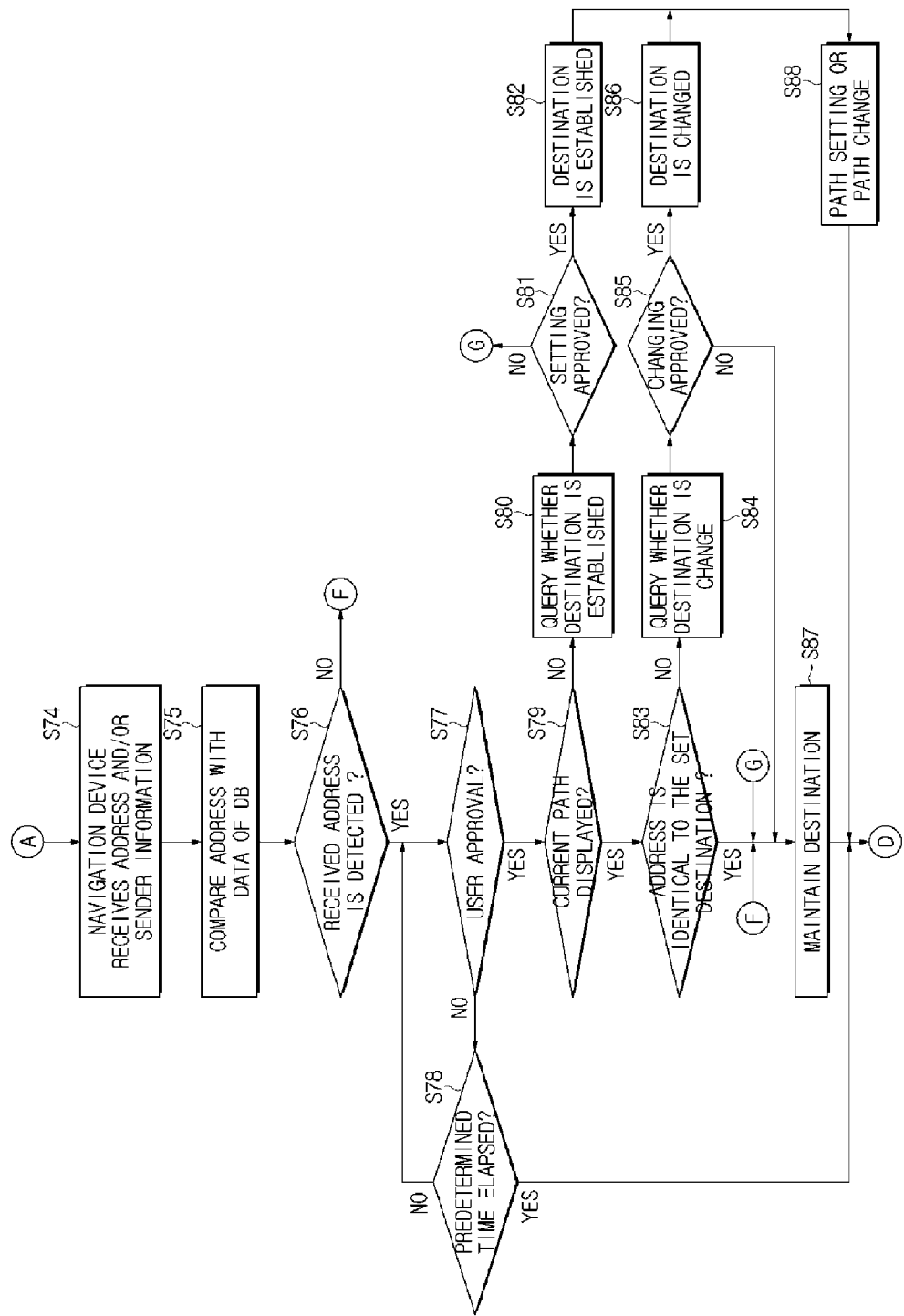
FIG. 11 is a flowchart illustrating a process executed by the navigation device for use in the method for inputting a location to the navigation device according to an embodiment of the present invention.

FIG. 11 is a flowchart illustrating a process executed by the navigation device for use in the method for inputting a location to the navigation device according to an embodiment of the present invention.

If the navigation device receives the address or the address and sender information in operation S74, the navigation device may compare the received address with each data of the DB in operation S75. The compared DB may include an address DB or the POI DB.

If the received address is detected from the DB in operation S76, the destination may be established by the navigation device using the received address, or the legacy destination may be changed to another. In accordance with one embodiment, the operations (S75 and S76) for comparing the address with data stored in the DB may be omitted as necessary.

If the user desires to establish or change the destination using the received address, the received address is displayed for user recognition, so that the user may approve the displayed address in operation S77. In other words, the navigation device may query the user for information as to whether the received address is correctly extracted. In this case, although a predetermined time elapses, if it is not confirmed whether the address received by the user is correctly extracted in operation S78, or if the user stops the destination setting or changing process by manipulating the navigation device, the method for inputting the place to the navigation device may be finished. The user confirmation operations S77 and S78 may be omitted as necessary.

Subsequently, if the navigation device currently displays a path toward the legacy destination in operation S79, it is determined whether the received address is identical to the legacy destination in operation S83. In this case, the received address is compared with the legacy destination address or the legacy region name, so that it can be determined whether the received address is identical to the legacy destination.

If the received address is identical to the legacy destination in operation S83, the navigation device can maintain the legacy destination in operation S87. In this case, the navigation device may not display messages related to the destination setting or changing process at all.

If the navigation device does not display or indicate the path toward the legacy destination in operation S79, the navigation device may inform the user of information as to whether or not the destination is established in operation S80.

For example, the navigation device may display the popup message shown in FIG. 6A so that it may inquire of the user about information as to whether the destination is established. Accordingly, if the user approves the destination setting in operation S81, the navigation device may establish the destination according to the received address in operation S82. If the destination is established, the navigation device may display the popup message for indicating the destination setting on the display unit as shown in FIG. 6C. Subsequently, the path may be established according to the established destination in operation S88. If the user does not approve the destination setting in operation S81, the destination can be maintained in operation S87.

If the navigation device currently displays a path toward the legacy destination or if the address is different from the destination where the address is established in operation S83, the navigation device may query the user on whether the destination is changed in operation S84. For example, the navigation device may display the popup message shown in FIG. 6B on the display unit, so that the navigation device may query the user on whether the destination is established. Therefore, if the user approves the change of the destination in operation S85, the navigation device may delete the legacy destination and may re-establish the destination according to the received address in operation S86, so that the destination can be changed to another destination. If the destination is changed, the navigation device may display the popup message for indicating the destination change on the display unit as shown in FIG. 6C. Subsequently, the path may be changed to another in response to the changed destination in operation S88. If the user does not approve the destination change in operation S85, the destination can be maintained in operation S87.

Figure 12:
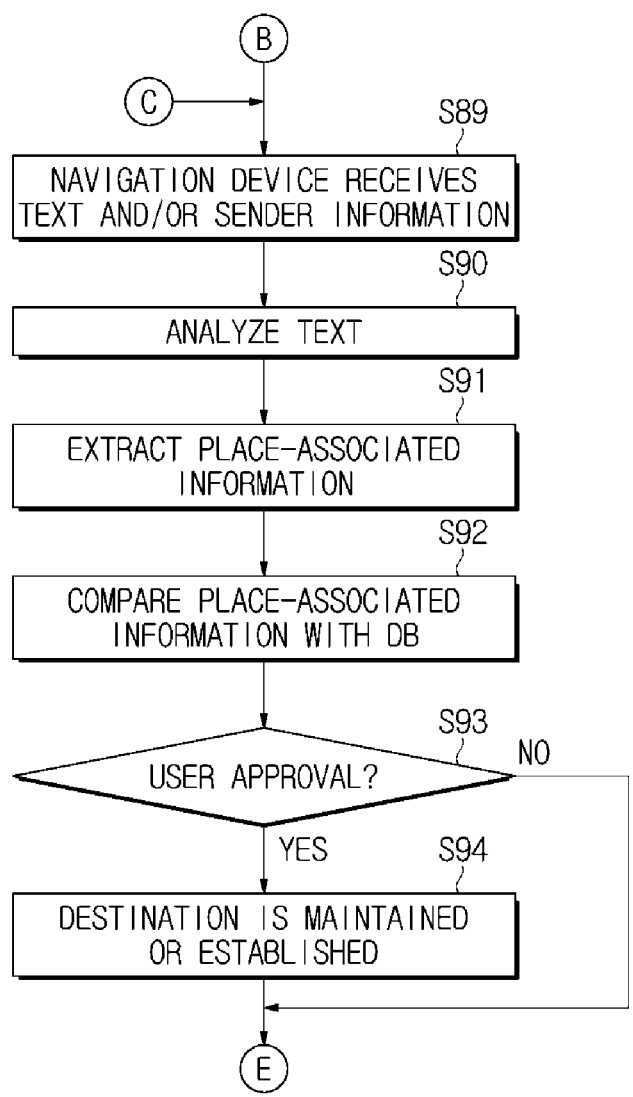
FIG. 12 is a flowchart illustrating another process executed by a terminal device for use in the method for inputting a location to the navigation device according to another embodiment of the present invention.

FIG. 12 is a flowchart illustrating another process executed by a terminal device for use in the method for inputting a location to the navigation device according to another embodiment of the present invention.

Referring to FIG. 12, if the navigation device receives all or some parts of text or receives all or some parts of the text and the sender information in operation S89, the navigation device may analyze all or some parts of the received text in operation S90.

The navigation device analyzes all or some parts of the text so as to obtain one or more words, and compares the one or more words with each data of the database (DB) so that the navigation device can extract the place-associated information in operation S91. In this case, the compared DB may include an address DB or a POI DB stored in the navigation device. The extracted place-associated information may include at least one of an address, a region name, a place type, and a sender intention text as described above.

If the navigation device receives the place-associated information, the operation for extracting the place-associated information may be omitted as necessary.

If the place-associated information is extracted, the navigation device may search for the place-associated information in the DB, and may detect a POI corresponding to the place-associated information in operation S92. If the POI is detected, the navigation device may establish or change the destination using the detected POI. For example, the navigation device may search for the place-associated information in the POI DB, and may obtain one or more POIs according to the search result.

Subsequently, the navigation device may establish or change the destination using one or more extracted POIs in operations S93 and S94. In this case, the navigation device may receive user acceptance in operation S93, and may establish or change the destination in operation S94, using the same methods as in operations S77 to S88 of FIG. 11 or using different methods within the scope capable of being modified by those skilled in the art.

In the same manner as in FIG. 11, if the navigation device currently displays (or indicates) the path (i.e., if the navigation device currently performs a navigation service) in operation S79, or if the navigation device provides a current path, it is determined whether the currently-established destination is identical to another destination to be changed using the place-associated information in operation S83, and the destination may be established or changed according to the determined result in operations (S82, S86). If the destination is established or changed, the path may also be established or changed in operation S88. If the navigation device is displaying a current path and the currently-established destination is identical to a destination to be changed using the place-associated information, the navigation device may maintain the destination in operation S87.

The destination is established or changed in operations (S82, S86, S94) through the above-mentioned method. After the path is established or changed in response to the established or changed destination in operation S87, the terminal device may continuously receive any additional text in operation S73. If the terminal device receives the additional text, the above operations (S63 to S94) may be repeatedly performed.

As is apparent from the above description, according to the navigation device, the system for inputting a location to the navigation device, and a method for inputting a location to the navigation device using a terminal device, in case of a user who manipulates the navigation device or does not simply manipulate the navigation device, a location corresponding to a text message received from a third party can be set to a destination of the navigation device.

According to the navigation device, the system for inputting a location to the navigation device, and the method for inputting a location to the navigation device using a terminal device, if a user receives information regarding a location through the terminal device, the user need not directly input the received location information to the navigation device.

According to the navigation device, the system for inputting a location to the navigation device, and the method for inputting a location to the navigation device using a terminal device, the user can conveniently operate and manipulate the navigation device.

According to the navigation device, the system for inputting a location to the navigation device, and the method for inputting a location to the navigation device using a terminal device, a user who drives a vehicle need not precisely manipulate the navigation device, and driving safety is increased.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for inputting a place to a navigation device, which has a first processor, communicating with a terminal device, which has a second processor, comprising:
   receiving, by the second processor, a text;
   identifying, by the second processor, a sender who transmits the text;
   determining, by the second processor, whether to extract place-associated information from the text according to the sender who transmits the text;
   extracting, by the second processor, the place-associated information from the text received by the terminal device;
   transmitting, by the second processor, the text or the place-associated information detected from the text to the navigation device after the place-associated information is extracted from the text; and
   setting, by the first processor, a place obtained on the basis of the place-associated information to a destination,
   wherein the place-associated information includes a sender intention text including an expression associated with intention of the sender,
   wherein the sender intention text comprises at least one word or phrase that is related to a request to move to a specific place,
   wherein the extracting comprises:
   extracting the sender intention text from the text received by the terminal device using a sender intention text database.

2. The method according to claim 1, wherein the place-associated information further includes at least one of an address, a region name, of a place type.

3. The method according to claim 1, wherein the setting the place obtained on the basis of the place-associated information to the destination includes:
   detecting the place-associated information by allowing the navigation device to analyze the text; and
   setting a destination using the detected place-associated information.

4. The method according to claim 3, wherein the setting the destination includes:
   searching at least one Point Of Interest (POI) from a Point Of Interest database (POI database) using the place-associated information detected by analyzing the text; and
   establishing the destination in response to a search result of the POI database.

5. The method according to claim 3, wherein the transmitting, by the second processor, the text or the place-associated information detected from the text to the navigation device after the place-associated information is extracted from the text includes:
   if the place-associated information is at least one of a region name, a place type, or the sender intention text, transmitting the text to the navigation device.

6. The method according to claim 1, wherein:
   the transmitting, by the second processor, the text or the place-associated information detected from the text to the navigation device after the place-associated information is extracted from the text includes:
   if the place-associated information is an address, transmitting the address to the navigation device by the terminal device; and
   the setting the place obtained on the basis of the place-associated information to the destination by the navigation device includes:
   setting the address to the destination by the navigation device.

7. The method according to claim 1, wherein the extracting the place-associated information from the text received by the terminal device includes:
   searching for the place-associated information using a Point Of Interest (POI) database.

8. The method according to claim 1, further comprising:
   transmitting information regarding the sender of the text to the navigation device.

9. The method according to claim 1, wherein the setting the place obtained on basis of the place-associated information to a destination by the navigation device includes:
   querying whether the place obtained on basis of the place-associated information is to be set to a destination.

10. The method according to claim 9, wherein the setting the place obtained on the basis of the place-associated information to the destination by the navigation device further includes:
    determining whether the navigation device is in a navigation state indicating a path guiding state;
    if the navigation device is in the navigation state, determining whether a legacy destination is different from the place obtained on basis of the place-associated information;
    if the legacy destination is different from the place obtained on basis of the place-associated information, deleting the legacy destination, and querying whether or not the place obtained on the basis of the place-associated information is set to the destination.

11. The method according to claim 1, further comprising:
    determining, by the terminal device, whether the place-associated information is extracted according to the sender who has transmitted the text.

12. A system for inputting a place, comprising:
    a terminal device including: a first communicator configured to receive a text; and a first processor configured to receive the text from the first communicator, to identify a sender who transmits the text, to determine whether to extract place-associated information from the text according to the sender who transmits the text, and to search for the place-associated information from the text; and
    a navigation device including: a second communicator configured to communicate with the terminal device; and a second processor configured to receive the place-associated information or a text including the place-associated information from the terminal device if the place-associated information is searched for from the text, and configured to establish a destination on the basis of the place-associated information,
    wherein the place-associated information includes a sender intention text including an expression associated with intention of the sender,
    wherein the sender intention text comprises at least one word or phrase that is related to a request to move to a specific place,
    wherein the terminal device or the navigation device searches for the sender intention text from the text using a sender intention text database.

13. The system according to claim 12, wherein the place-associated information further includes at least one of an address, a region name, or a place type.

14. The system according to claim 12, wherein second processor is further configured to detect the place-associated information by analyzing the text, and establishes the destination using the detected place-associated information.

15. The system according to claim 12, wherein: the second processor is further configured to transmit an address to the navigation device, and sets the address to the destination if the place-associated information is the address.

16. The system according to claim 12, wherein at least one of the first processor or the second processor is further configured to obtain the place-associated information using a Point Of Interest (POI) database.

17. The system according to claim 12, wherein the first communicator is further configured to transmit information regarding the sender of the text to the second communicator.

18. The system according to claim 12, wherein the navigation device further comprises a display configured to query whether the place obtained on the basis of the place-associated information is to be set to the destination.

19. The system according to claim 18, wherein the display is further configured to query whether a legacy destination is identical to the place obtained on the basis of the place-associated information, and to query whether the place obtained on the basis of the place-associated information is to be set to the destination according to a state of the navigation device.

20. The system according to claim 12, wherein the first processor is further configured to determine whether place-associated information is extracted according to the sender who has transmitted the text.

21. A navigation device comprising:
a processor configured to:
communicate with a terminal device using at least one of a short-range communication module or a mobile communication module;
receive a text including place-associated information;
identify a sender who transmits the text;
determine whether to extract the place-associated information from the text according to the sender who transmits the text; and
establish a destination on the basis of the place-associated information,
wherein the place-associated information includes a sender intention text including an expression associated with an intention of the sender,
wherein the sender intention text comprises at least one word or phrase that is related to a request to move to a specific place,
wherein the processor is further configured to extract the sender intention text from the text using a sender intention text database.

* * * * *